US012354521B2

(12) United States Patent
Chen et al.

(10) Patent No.: US 12,354,521 B2
(45) Date of Patent: Jul. 8, 2025

(54) DISPLAY DEVICE

(71) Applicant: HannStar Display Corporation, Taipei (TW)

(72) Inventors: Jing-Xuan Chen, Tainan (TW); Yen-Chung Chen, Taichung (TW); Mu-Kai Kang, Tainan (TW); Qi-En Luo, Chiayi County (TW); Cheng-Yen Yeh, Taichung (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 18/457,318

(22) Filed: Aug. 28, 2023

(65) Prior Publication Data

US 2024/0105098 A1 Mar. 28, 2024

(30) Foreign Application Priority Data

Sep. 27, 2022 (CN) ......................... 202211182154.8

(51) Int. Cl.
*G09G 3/20* (2006.01)

(52) U.S. Cl.
CPC ... *G09G 3/2092* (2013.01); *G09G 2300/0426* (2013.01); *G09G 2310/0289* (2013.01); *G09G 2330/021* (2013.01)

(58) Field of Classification Search
CPC ......... G09G 3/2092; G09G 2300/0426; G09G 2310/0289; G09G 2330/021
See application file for complete search history.

(56) References Cited

U.S. PATENT DOCUMENTS

| | | | | |
|---|---|---|---|---|
| 10,665,194 B1 * | 5/2020 | Xu | G09G 3/3677 |
| 2013/0271504 A1 * | 10/2013 | Kim | G09G 3/003 345/690 |
| 2015/0243203 A1 * | 8/2015 | Kim | G09G 3/3291 345/212 |
| 2016/0225304 A1 * | 8/2016 | Kim | G09G 3/3666 |
| 2017/0032734 A1 | 2/2017 | Hao et al. | |

(Continued)

FOREIGN PATENT DOCUMENTS

| | | | |
|---|---|---|---|
| CN | 101241283 A * | 8/2008 | G02F 1/1345 |
| CN | 108417172 | 8/2018 | |
| TW | 202018689 | 5/2020 | |

OTHER PUBLICATIONS

"Office Action of Taiwan Counterpart Application", issued on Apr. 15, 2024, p. 1-p. 5.

*Primary Examiner* — Stacy Khoo
(74) *Attorney, Agent, or Firm* — JCIPRNET

(57) ABSTRACT

A display device including a display panel is disclosed. The display panel includes a substrate, multiple scan lines, multiple data lines, multiple pixel structures, a first gate driving circuit, and a second gate driving circuit. The pixel structures are electrically connected to the scan lines and the data lines. Multiple first output stage circuits of the first gate driving circuit disposed in a peripheral area are electrically connected to the scan lines. Multiple second output stage circuits of the second gate driving circuit disposed in the peripheral area are electrically connected to the scan lines. A channel width of a first output transistor of the first output stage circuit is greater than a channel width of a second output transistor of the second output stage circuit.

18 Claims, 19 Drawing Sheets

2

(56) References Cited

U.S. PATENT DOCUMENTS

| | | | | |
|---|---|---|---|---|
| 2017/0061888 | A1* | 3/2017 | Nam | G09G 3/3266 |
| 2018/0059497 | A1 | 3/2018 | Lee et al. | |
| 2018/0129106 | A1 | 5/2018 | Gao et al. | |
| 2020/0168170 | A1 | 5/2020 | Xu | |
| 2022/0326561 | A1* | 10/2022 | Asai | G09G 3/3685 |

* cited by examiner

DISPLAY DEVICE

CROSS-REFERENCE TO RELATED APPLICATION

This application claims the priority benefit of Chinese application serial no. 202211182154.8, filed on Sep. 27, 2022. The entirety of the above-mentioned patent application is hereby incorporated by reference herein and made a part of this specification.

BACKGROUND

Technical Field

The disclosure relates to a display device, and particularly relates to a display device having variable driving frequencies.

Description of Related Art

Along with the rise of environmental protection awareness of energy saving and carbon reduction, a display device capable of switching a driving frequency according to a usage situation has been proposed. A design of a gate driving circuit of this type of display device needs to satisfy a charging specification under high-frequency driving. However, when the display device is driven at a low frequency, the same circuit design will cause unnecessary waste of power consumption. Therefore, how to reduce power consumption during low-frequency driving is a technical problem to be resolved for panel manufacturers.

SUMMARY

The disclosure is directed to a display device, where an operating power consumption thereof is adapted to be adjusted according to different driving frequencies.

An embodiment of the disclosure provides a display device including a display panel. The display panel includes a substrate, multiple scan lines, multiple data lines, multiple pixel structures, a first gate driving circuit, and a second gate driving circuit. The substrate is provided with a display area and a peripheral area outside the display area. The scan lines and the data lines are disposed in the display area. The pixel structures are disposed in the display area and are electrically connected to the scan lines and the data lines. The first gate driving circuit is disposed in the peripheral area and includes multiple first output stage circuits. The first output stage circuits are electrically connected to the scan lines. The second gate driving circuit is disposed in the peripheral area and includes multiple second output stage circuits. The second output stage circuits are electrically connected to the scan lines. The first output stage circuits respectively have a first output transistor. The second output stage circuits respectively have a second output transistor. A channel width of the first output transistor is greater than a channel width of the second output transistor.

In the display device according to the embodiment of the disclosure, when the display panel is driven at a first frame rate, the first output stage circuits output multiple first gate driving signals to the scan lines. When the display panel is driven at a second frame rate, the second output stage circuits output multiple second gate driving signals to the scan lines, where the first frame rate is greater than the second frame rate.

In the display device according to the embodiment of the disclosure, the display panel further includes multiple first clock signal lines and multiple second clock signal lines disposed in the peripheral area. The first output stage circuits are electrically connected to the first clock signal lines, and the second output stage circuits are electrically connected to the second clock signal lines. The first clock signal lines are adapted to transmit multiple first clock signals to the first output stage circuits, the second clock signal lines are adapted to transmit multiple second clock signals to the second output stages circuit, and a frequency of each of the first clock signals is greater than a frequency of each of the second clock signals.

In the display device according to the embodiment of the disclosure, the first gate driving circuit and the second gate driving circuit are respectively located on two opposite sides of the display area.

In the display device according to the embodiment of the disclosure, one of the first gate driving circuit and the second gate driving circuit is located on a first side of the display area. The other one of the first gate driving circuit and the second gate driving circuit is located on a second side of the display area, and the second side is adjacent to the first side.

In the display device according to the embodiment of the disclosure, the display panel further includes a third gate driving circuit. The third gate driving circuit is disposed in the peripheral area and includes multiple third output stage circuits. The third output stage circuits are electrically connected to the scan lines. The third output stage circuits respectively have a third output transistor. A channel width of the third output transistor is smaller than the channel width of the second output transistor.

In the display device according to the embodiment of the disclosure, when the display panel is driven at a first frame rate, the first output stage circuits output multiple first gate driving signals to the scan lines. When the display panel is driven at a second frame rate, the second output stage circuits output multiple second gate driving signals to the scan lines. When the display panel is driven at a third frame rate, the third output stage circuits output multiple third gate driving signals to the scan lines. The first frame rate is greater than the second frame rate, and the second frame rate is greater than the third frame rate.

In the display device according to the embodiment of the disclosure, one, another, and the other of the first gate driving circuit, the second gate driving circuit, and the third gate driving circuit are respectively located at a first side, a second side, and a third side of the display area. The second side is adjacent to the first side, and the third side is adjacent to the second side and opposite to the first side.

In the display device according to the embodiment of the disclosure, the display panel further includes multiple auxiliary signal lines electrically connected to the another one of the first gate driving circuit, the second gate driving circuit, and the third gate driving circuit. Each of the scan lines is electrically connected to a corresponding one of the auxiliary signal lines.

In the display device according to the embodiment of the disclosure, the pixel structure includes a pixel transistor, a pixel electrode, and a common electrode. The pixel transistor is electrically connected to one of the scan lines and one of the data lines. The pixel electrode is electrically connected to the pixel transistor. The common electrode overlaps the pixel electrode. The auxiliary signal lines are electrically connected to the scan lines through multiple conductive patterns, and one of the pixel electrode and the common electrode is of a same film layer as the conductive patterns.

In the display device according to the embodiment of the disclosure, the scan lines belong to a first metal layer, and the auxiliary signal lines belong to a second metal layer. The display panel further includes an insulating layer located between the first metal layer and the second metal layer. The insulating layer has multiple through holes, and each of the auxiliary signal lines is electrically connected to a corresponding one of the scan lines through a corresponding one of the through holes.

In the display device according to the embodiment of the disclosure, the display panel further includes multiple first clock signal lines and multiple second clock signal lines disposed in the peripheral area. The first output stage circuits are electrically connected to the first clock signal lines, and the second output stage circuits are electrically connected to the second clock signal lines. The display device further includes a driving chip disposed on the substrate and located in the peripheral area. The driving chip has multiple first signal pins, multiple second signal pins, and multiple third signal pins. The first clock signal lines are electrically coupled to the first signal pins. The second clock signal lines are electrically coupled to the second signal pins. The data lines are electrically coupled to the third signal pins.

In the display device according to the embodiment of the disclosure, the display panel further includes multiple first clock signal lines and multiple second clock signal lines disposed in the peripheral area. The first output stage circuits are electrically connected to the first clock signal lines, and the second output stage circuits are electrically connected to the second clock signal lines. The display device further includes a driving chip and a flexible circuit board. The driving chip is disposed on the substrate and located in the peripheral area. The driving chip has multiple first signal pins and multiple second signal pins. The data lines are electrically coupled to the second signal pins. The first clock signal lines and the second clock signal lines are respectively electrically coupled to the first signal pins and the flexible circuit board, or respectively electrically coupled to the flexible circuit board and the first signal pins.

In the display device according to the embodiment of the disclosure, the display panel further includes multiple first clock signal lines and multiple second clock signal lines disposed in the peripheral area. The first output stage circuits are electrically connected to the first clock signal lines, and the second output stage circuits are electrically connected to the second clock signal lines. The display device further includes a flexible circuit board electrically coupled to the first clock signal lines and the second clock signal lines.

In the display device according to the embodiment of the disclosure, the flexible circuit board is provided with a voltage level shifter circuit. The first clock signal lines and the second clock signal lines are electrically coupled to the voltage level shifter circuit.

Based on the above description, in the display device according to an embodiment of the disclosure, the pixel structures, the scan lines, and the data lines electrically connected to each other are disposed in the display area, and the first gate driving circuit and the second gate driving circuit are disposed outside the display area. The two gate driving circuits respectively have multiple output stage circuits electrically connected to the scan lines and the clock signal lines, and the output stage circuits are respectively provided with an output transistor. As a channel width of the output transistor of each of the output stage circuits of the first gate driving circuit is larger than a channel width of the output transistor of each of the output stage circuits of the second gate driving circuit, the display device may select an appropriate gate driving circuit under operations of different driving frequencies to avoid waste of power consumption during operation.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
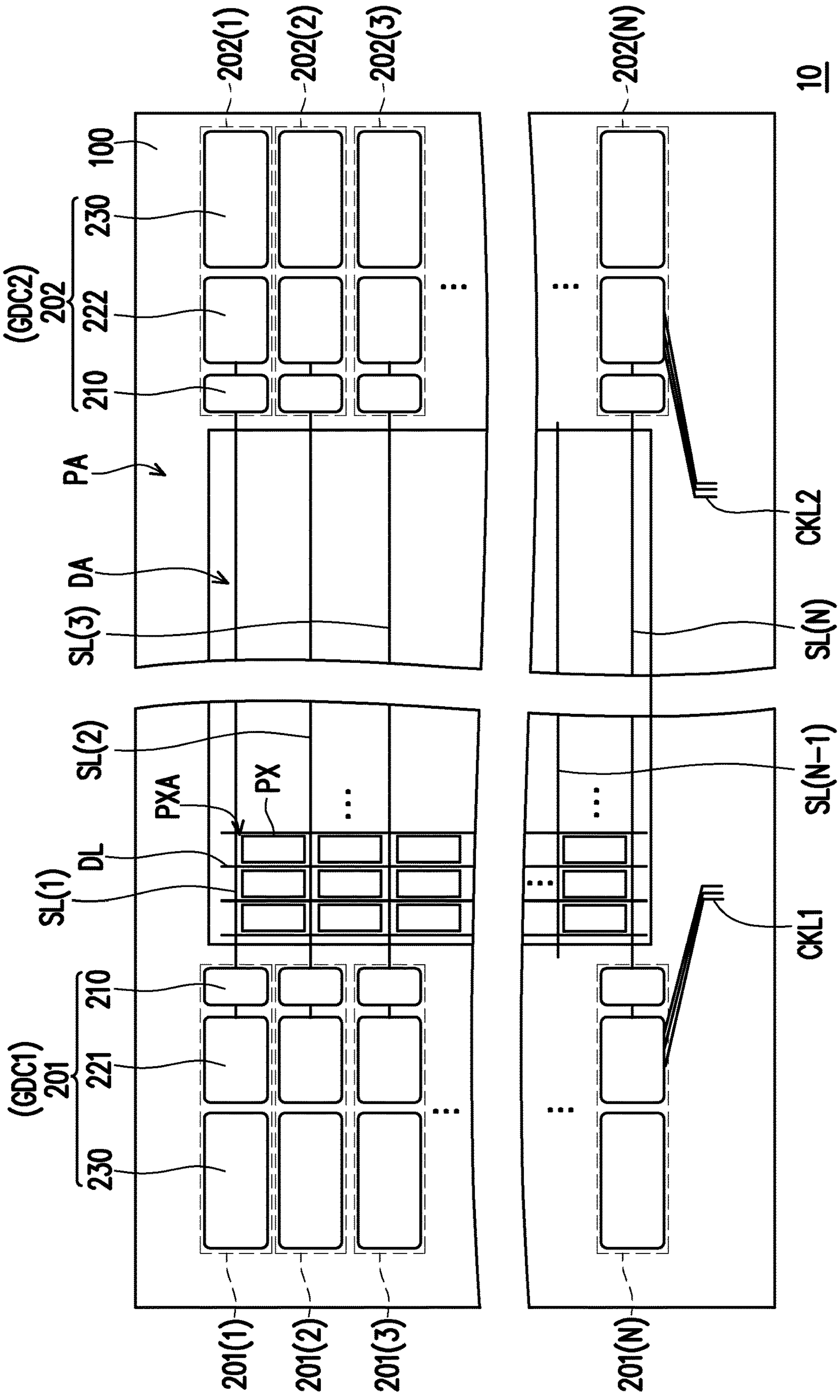
FIG. 1 is a schematic front view of a display panel according to a first embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
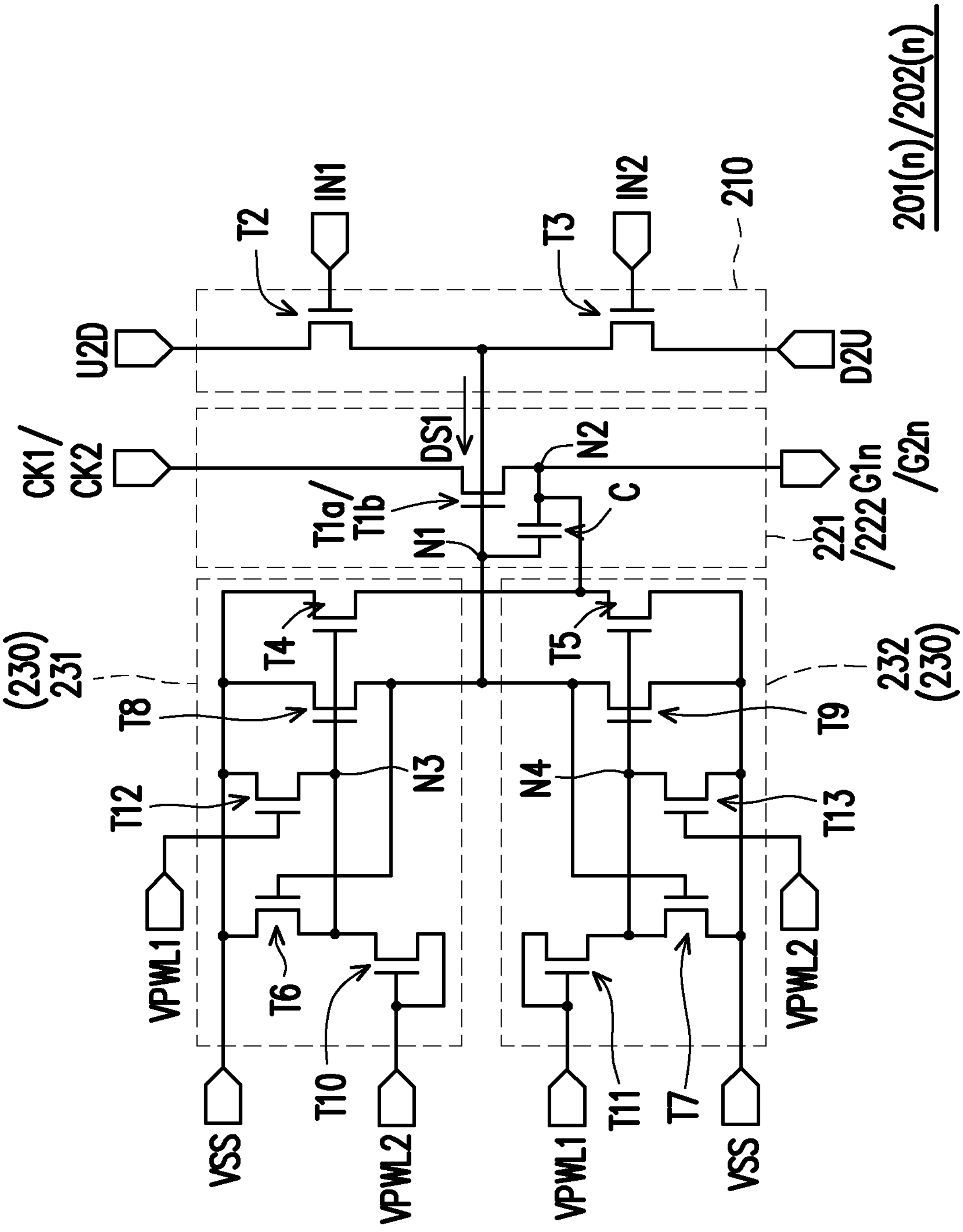
FIG. 2 is a schematic circuit diagram of a shift register circuit in FIG. 1.
Figure 3A:
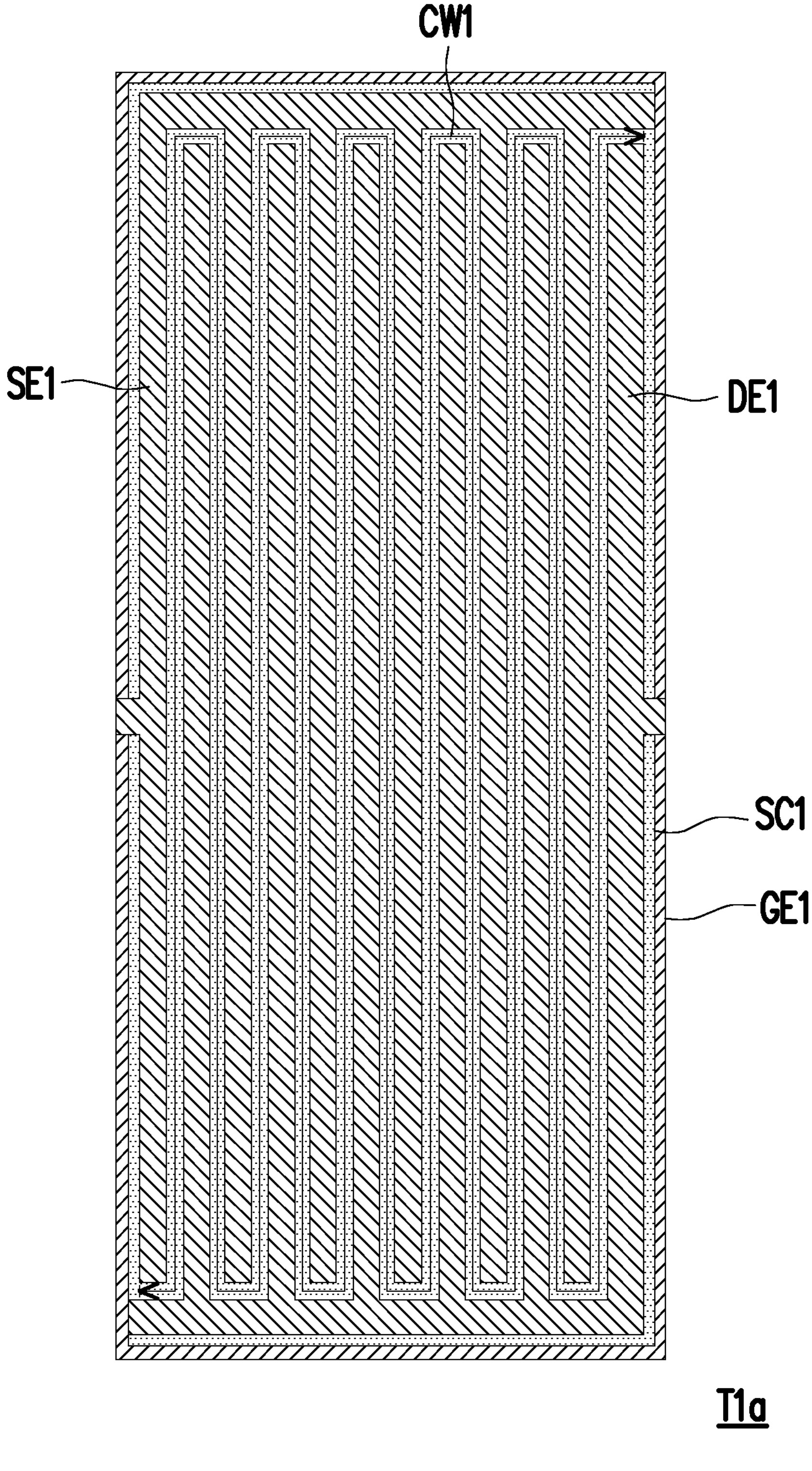
FIG. 3A and FIG. 3B are respectively schematic front views of a first output transistor of a first output stage circuit and a second output transistor of a second output stage circuit of FIG. 1.
Figure 3B:
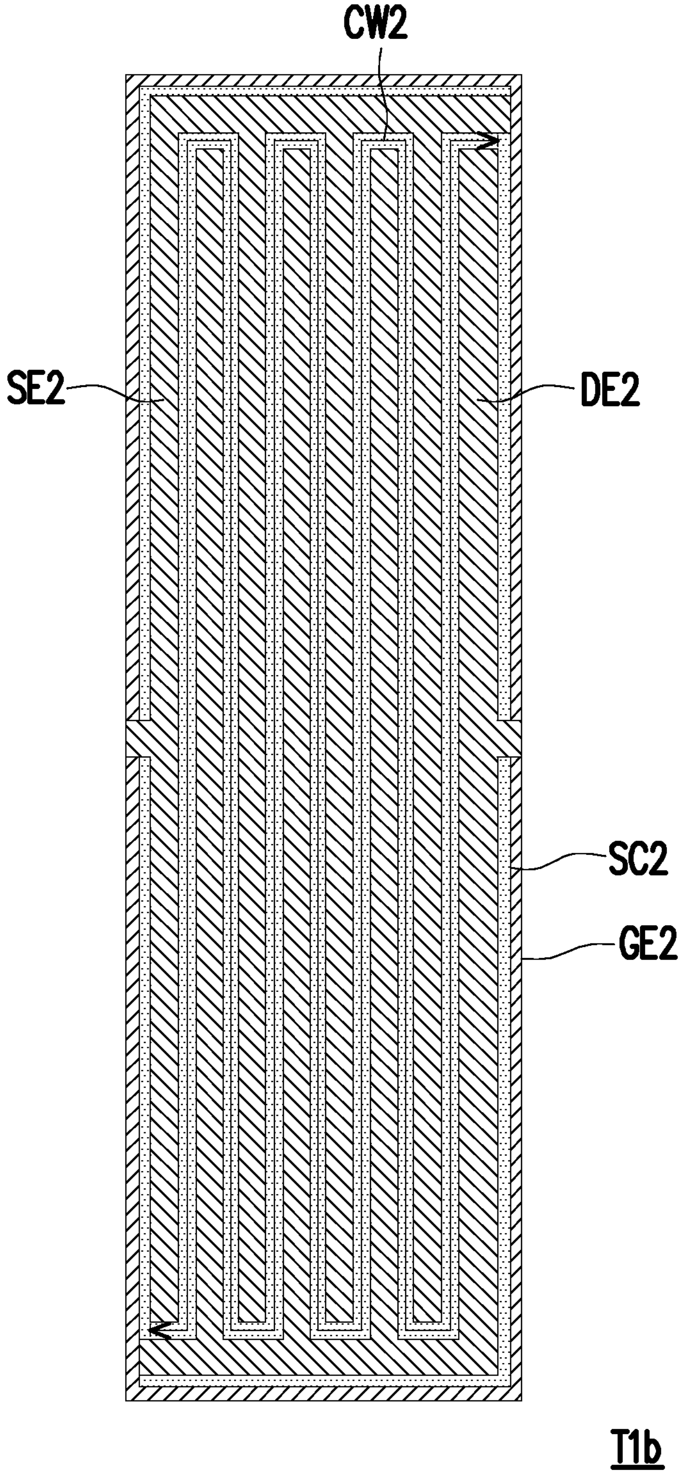

FIG. 1 is a schematic front view of a display panel according to a first embodiment of the disclosure. FIG. 2 is a schematic circuit diagram of an $n^{th}$ stage shift register circuit in FIG. 1. FIG. 3A and FIG. 3B are respectively schematic front views of a first output transistor of a first output stage circuit and a second output transistor of a second output stage circuit of FIG. 1. Referring to FIG. 1 and FIG. 2, a display panel 10 includes a substrate 100, multiple scan lines SL(1)-SL(N), multiple data lines DL and multiple pixel structures PX. The substrate 100 is provided with a display area DA and a peripheral area PA outside the display area DA. The scan lines SL(1)-SL(N) and the data lines DL are disposed in the display area DA and intersect with each other to define multiple pixel areas PXA. The pixel areas PXA are respectively provided with the pixel structures PX, and the scan lines SL(1)-SL(N) and the data lines DL are electrically connected to the pixel structures PX.

In the embodiment, a first gate driving circuit GDC1 and a second gate driving circuit GDC2 are disposed in the peripheral area PA of the substrate 100. For example, the first gate driving circuit GDC1 and the second gate driving circuit GDC2 are respectively located on two opposite sides of the display area DA, and are electrically connected to respective opposite ends of the scan lines SL(1)-SL(N), but the disclosure is not limited thereto. Specifically, the two opposite ends of any one of the scan lines SL(1)-SL(N) are electrically connected to the first gate driving circuit GDC1 and the second gate driving circuit GDC2 respectively. In the embodiment, the first gate driving circuit GDC1 and the second gate driving circuit GDC2 may be GOA (gate driver on array) type gate driving circuits, but the disclosure is not limited thereto. For example, transistors in the first gate driving circuit GDC1 and the second gate driving circuit GDC2 may be thin film transistors, and are fabricated in a same step as that of pixel transistors in the pixel structure PX, but the disclosure is not limited thereto. Correspondingly, the peripheral area PA is further provided with multiple first clock signal lines CKL1 and multiple second clock signal lines CKL2, where the first gate driving circuit GDC1 is electrically connected to the first clock signal lines CKL1, the second gate driving circuit GDC2 is electrically connected to the second clock signal lines CKL2.

Each of the two gate driving circuits is adapted to receive multiple clock signals from the corresponding clock signal lines, and output multiple gate driving signals to the scan lines SL(1)-SL(N), where each of the scan lines SL(1)-SL(N) is electrically connected to at least one corresponding pixel structure PX. For example, the display panel 10 may individually control these pixel structures PX through the two gate driving circuits and a source driving circuit (not shown) to drive a display medium layer (not shown) to emit light or modulate light, so as to achieve an effect of displaying images. The display medium layer here is, for example, multiple light emitting diodes (LEDs) (such as micro LEDs, organic LEDs or mini LEDs) or a liquid crystal layer, but the disclosure is not limited thereto.

In the embodiment, the first gate driving circuit GDC1 includes multiple shift register circuits 201 (such as a first to $N^{th}$ stage shift register circuits 201(1)-201(N)), and the second gate driving circuit GDC2 includes multiple shift register circuits 202 (such as a first to $N^{th}$ stage shift register circuits 202(1)-202(N)). The two opposite ends of the scan line SL(n) are respectively electrically connected to the $n^{th}$ stage shift register circuit 201($n$) of the first gate driving circuit GDC1 and the $n^{th}$ stage shift register circuit 202($n$) of the second gate driving circuit GDC2, where n is a positive integer greater than or equal to 1 and less than or equal to N. The shift register circuit 201 and the shift register circuit 202 may respectively include multiple transistors and a capacitor C. These transistors and the capacitor C respectively constitute a pull-up circuit, an output stage circuit and a pull-down circuit of the shift register circuit. It should be noted that the disclosure does not limit the number of transistors and capacitors in each shift register circuit, and the number of these elements may be adjusted according to an actual circuit design of the product.

For example, the peripheral area PA is further provided with a first control signal line (not shown), a second control signal line (not shown) and a power line (not shown). Pull-down circuits 230 of the first gate driving circuit GDC1 and the second gate driving circuit GDC2 are electrically connected to these first and second control signal lines and the power line, and pull down a first node N1 and a second node N2 to a reference voltage VSS according to a first control signal VPWL1 from the first control signal line and a second control signal VPWL2 from the second control signal line, where the reference voltage VSS is a voltage provided by the power line. For example, the reference voltage VSS may be a gate low voltage or a ground voltage, but the reference voltage VSS is not limited thereto. An output stage circuit 221 of the $n^{th}$ stage shift register circuit 201($n$) of the first gate driving circuit GDC1 generates an $n^{th}$ stage gate driving signal G1n of the first gate driving circuit GDC1 based on a precharge signal DS1 generated by a precharge circuit 210 of the $n^{th}$ stage shift register circuit 201 ($n$) and the first clock signal CK1 from the first clock signal line CKL1, and an output stage circuit 222 of the $n^{th}$ stage shift register circuit 202($n$) of the second gate driving circuit GDC2 generates an $n^{th}$ stage gate driving signal G2n of the second gate driving circuit GDC2 based on the precharge signal DS1 generated by the precharge circuit 210 of the $n^{th}$ stage shift register circuit 202 ($n$) and the second clock signal CK2 from the second clock signal line CKL2.

In the embodiment, each shift register circuit 201 of the first gate driving circuit GDC1 includes the precharge circuit 210, the output stage circuit 221 and the pull-down circuit 230, and each shift register circuit of the second gate driving circuit GDC2 202 includes the precharge circuit 210, the output stage circuit 222 and the pull-down circuit 230. It should be noted that designs of some components of the respective output stage circuits of the two gate driving circuits are different, which will be explained in detail later.

First, in the embodiment, a circuit (for example, the number of transistors and an electrical connection method) of the precharge circuit 210 of the $n^{th}$ stage shift register circuit 201 ($n$) of the first gate driving circuit GDC1 and a size of the transistors in the circuit may be the same as a circuit of the precharge circuit 210 of the $n^{th}$ stage shift register circuit 202 ($n$) of the second gate driving circuit GDC2 and a size of the transistors in the circuit, but the disclosure is not limited thereto. In some other embodiments, the circuit of the precharge circuit 210 of the $n^{th}$ stage shift register circuit 201 ($n$) of the first gate driving circuit GDC1 and the size of the transistors in the circuit may be different to the circuit of the precharge circuit 210 of the $n^{th}$ stage shift register circuit 202 ($n$) of the second gate driving circuit GDC2 and the size of the transistors in the circuit. The precharge circuit 210 of the $n^{th}$ stage shift register circuit 201($n$) or 202($n$) includes a transistor T2 and a transistor T3. A control terminal of the transistor T2 receives a first input signal IN1. The first input signal IN1 may be, for example, a first direction scan start signal or a gate driving signal output by a shift register circuit before the $n^{th}$ stage shift register circuit 201($n$) or 202($n$) (for example, but not limited to an $(n-1)^{th}$ stage gate driving signal output from the previous stage shift register circuit 201($n-1$) or 202($n-1$)), a first terminal of the transistor T2 receives a first scan direction signal U2D, a second terminal of the transistor T2 is connected to a second terminal of the transistor T3, and the second terminal of the transistor T2 and the second terminal of the transistor T3 are electrically connected to the first node N1. A control terminal of the transistor T3 receives a second input signal IN2. The second input signal IN2 may be, for example, a second direction scan start signal or a gate driving signal output by a shift register circuit after the $n^{th}$ stage shift register circuit 201(*n*) or 202(*n*) (for example, but not limited to an $(n+1)^{th}$ stage gate driving signal output from a next stage shift register circuit 201(*n*+1) or 202(*n*+1)), and a first terminal of the transistor T3 receives a second scan direction signal D2U. The precharge circuit 210 of the $n^{th}$ stage shift register circuit 201(*n*) or 202(*n*) generates a precharge signal DS1 according to the first scan direction signal U2D, the second scan direction signal D2U, the first input signal IN1 and the second input signal IN2, and the precharge signal DS1 may be transmitted to the first node N1. In the specification, the control terminal, the first terminal and the second terminal of each transistor in the $n^{th}$ stage shift register circuit 201(*n*) or 202(*n*) may be respectively a gate, a source and a drain of the transistor, or respectively the gate, the drain and the source of the transistor.

In the embodiment, the first scan direction signal U2D is configured to indicate that a scan direction of the gate driving circuit is a first direction (for example, a scan direction of the scan lines SL(1)-SL(N) in the display area DA of FIG. 1 is from the top to the bottom of FIG. 1)), and the second scan direction signal D2U is configured to indicate that the scan direction of the gate driving circuit is a second direction (for example, the scan direction of the scan lines SL(1)-SL(N) in the display area DA of FIG. 1 is from the bottom to the top of FIG. 1)).

It should be noted that the precharge circuit 210 of the embodiment is, for example, the precharge circuit 210 of the shift register circuits 201 and 202 with a bidirectional scan function (i.e., the precharge circuit 210 capable of receiving the first scan direction signal U2D and the second scan direction signal D2U), but the circuit of the precharge circuit 210 of the disclosure is not limited thereto. In some other embodiments, the precharge circuit 210 may be a precharge circuit of a shift register circuit that only has a unidirectional scan function. The disclosure does not limit the circuit of the precharge circuit 210.

The output stage circuit 221 of the $n^{th}$ stage shift register circuit 201(*n*) of the first gate driving circuit GDC1 includes a transistor T1a and a capacitor C. A control terminal of the transistor T1a is electrically connected to the first node N1, a first terminal of the transistor T1a receives the first clock signal CK1 from the first clock signal line CKL1, and the control terminal and a second terminal of the transistor T1a are respectively connected to a first terminal and a second terminal of the capacitor C, the second terminal of the transistor T1a is electrically connected to the second node N2, and the second terminal of the transistor T1a outputs the $n^{th}$ stage gate driving signal G1n (i.e., the first gate driving signal) to the corresponding scan line SL(n).

Similarly, the output stage circuit 222 of the $n^{th}$ stage shift register circuit 202(*n*) of the second gate driving circuit GDC2 includes a transistor T1b and the capacitor C. A control terminal of the transistor T1b is electrically connected to the first node N1, a first terminal of the transistor T1b receives the second clock signal CK2 from the second clock signal line CKL2, and the control terminal and a second terminal of the transistor T1b are respectively connected to the first terminal and the second terminal of the capacitor C, the second terminal of the transistor T1b is electrically connected to the second node N2, and the second terminal of the transistor T1b outputs the $n^{th}$ stage gate driving signal G2n (i.e., the second gate driving signal) to the corresponding scan line SL(n).

In other embodiments, the output stage circuit 221 of the first gate driving circuit GDC1 may include the transistor T1a but not include the capacitor C, and the output stage circuit 222 of the second gate driving circuit GDC2 may include the transistor T1b but not include the capacitor C, but the disclosure is not limited thereto.

In the embodiment, the number and electrical connection of the transistors of the output stage circuit 221 of the $n^{th}$ stage shift register circuit 201(*n*) of the first gate driving circuit GDC1 may be the same as the number and electrical connection of the transistors of the output stage circuit 222 of the $n^{th}$ stage shift register circuit 202(*n*) of the second gate driving circuit GDC2, but a size of the transistor T1a in the output stage circuit 221 of the $n^{th}$ stage shift register circuit 201(*n*) of the first gate driving circuit GDC1 is different from a size of the transistor T1b in the output stage circuit 222 of the $n^{th}$ stage shift register circuit 202(*n*) of the second gate driving circuit GDC2, but the disclosure is not limited thereto. In some other embodiments, the number and electrical connection of the transistors of the output stage circuit 221 of the $n^{th}$ stage shift register circuit 201(*n*) of the first gate driving circuit GDC1 and the size of the transistor T1a in the output stage circuit 221 may be different from the number and electrical connection of the transistors of the output stage circuit 222 of the $n^{th}$ stage shift register circuit 202(*n*) of the second gate driving circuit GDC2 and the size of the transistor T1b in the output stage circuit 222. Reference may be made to description of FIG. 3A to FIG. 3B for related description about the size of the transistor T1a in the output stage circuit 221 of the shift register circuit 201 of the first gate driving circuit GDC1 being different from the size of the transistor T1b in the output stage circuit 222 of the stage shift register circuit 202 of the second gate driving circuit GDC2.

In the embodiment, the circuit (for example, the number of transistors and the electrical connection method) of the pull-down circuit 230 of the $n^{th}$ stage shift register circuit 201(*n*) of the first gate driving circuit GDC1 and a size of the transistors in the circuit may be the same as the circuit of the pull-down circuit 230 of the $n^{th}$ stage shift register circuit 202(*n*) of the second gate driving circuit GDC2 and a size of the transistors in the circuit, but the disclosure is not limited thereto. In some other embodiments, the circuit of the pull-down circuit 230 of the $n^{th}$ stage shift register circuit 201(*n*) of the first gate driving circuit GDC1 and the size of the transistors in the circuit may be different from the circuit of the pull-down circuit 230 of the $n^{th}$ stage shift register circuit 202(*n*) of the second gate driving circuit GDC2 and the size of the transistors in the circuit.

In the embodiment, the number of the pull-down circuits 230 of the shift register circuit is, for example, two (a pull-down circuit 231 and a pull-down circuit 232), which does not mean that the disclosure is limited thereto. In other embodiments, the number of the pull-down circuits in the shift register circuit may also be one. The disclosure does not limit the circuit of the pull-down circuit 230.

The pull-down circuit 231 includes a transistor T4, a transistor T6, a transistor T8, a transistor T10, and a transistor T12. A control terminal of the transistor T6 and a first terminal of the transistor T8 are electrically connected to the first node N1. A first terminal of the transistor T4 is electrically connected to the second node N2. A first terminal of the transistor T6, a control terminal of the transistor T4, a control terminal of the transistor T8, a first terminal of the transistor T12 and a first terminal of the transistor T10 are electrically connected to a third node N3, a second terminal of the transistor T4, a second terminal of the transistor T6, a second terminal of the transistor T8 and a second terminal of the transistor T12 are coupled to the reference voltage VSS. A control terminal and the second terminal of the transistor T10 are electrically connected to each other and receive the second control signal VPWL2. A control terminal of the transistor T12 receives the first control signal VPWL1.

Similarly, the pull-down circuit 232 includes a transistor T5, a transistor T7, a transistor T9, a transistor T11, and a transistor T13. A control terminal of the transistor T7 and a first terminal of the transistor T9 are electrically connected to the first node N1. A first terminal of the transistor T5 is electrically connected to the second node N2. A first terminal of the transistor T7, a control terminal of the transistor T5, a control terminal of the transistor T9, a first terminal of the transistor T13 and a first terminal of the transistor T11 are electrically connected to a fourth node N4, a second terminal of the transistor T4, a second terminal of the transistor T7, a second terminal of the transistor T8 and a second terminal of the transistor T12 are coupled to the reference voltage VSS. A control terminal and a second terminal of the transistor T11 are electrically connected to each other and receive the first control signal VPWL1. A control terminal of the transistor T13 receives the second control signal VPWL2.

It should be noted that the disclosure does not limit the circuits of the $n^{th}$ stage shift register circuit 201(*n*) of the first gate driving circuit GDC1 and the $n^{th}$ stage shift register circuit 201(*n*) of the second gate driving circuit GDC2 based on the disclosure in FIG. 2. Namely, the circuits of the $n^{th}$ stage shift register circuit 201(*n*) of the first gate driving circuit GDC1 and the $n^{th}$ stage shift register circuit 202(*n*) of the second gate driving circuit GDC2 may be adjusted according to actual product design and application, which is not limited by the disclosure.

For example, when the gate driving circuit receives a scan start signal (not shown), multiple shift register circuits coupled in series (for example, the first to the $N^{th}$ stage shift register circuits 201(1)-201(N) or the first to $N^{th}$ stage shift register circuits 202(1)-201(N)) sequentially output gate driving signals to the scan lines SL(1)-SL(N) in the display area DA in a time sequence to individually control the pixel structures PX and display an image via a display medium layer (not shown). After the last stage shift register circuit outputs the gate driving signal, the gate driving circuit may receive a scan termination signal (not shown), and at this time, image updating of one frame period is completed.

In particular, in the embodiment, the display panel 10 may be driven at two different scan frequencies (or frame rates). For example, a frequency of the aforementioned first clock signal CK1 may be greater than a frequency of the second clock signal CK2. When the display panel 10 is to be driven at a higher scan frequency (or may be referred to as a first frame rate), the first gate driving circuit GDC1 is used to provide a first gate driving signal to the scan lines SL(1)-SL(N). Conversely, when the display panel 10 is to be driven at a lower scan frequency (or may be referred to as a second frame rate), the second gate driving circuit GDC2 is used instead to provide a second gate driving signal to the scan lines SL(1)-SL(N). For example, the first frame rate may be 60 Hz and the second frame rate may be less than 60 Hz (such as but not limited to 8 Hz); or the first frame rate may be 120 Hz and the second frame rate may be 60 Hz, but the values of the first frame rate and the second frame rate are not limited to the above examples. In other words, when the display panel 10 displays images, the scan lines SL(1)-SL(N) receive one of the first gate driving signal and the second gate driving signal, where when the frame rate of the display panel 10 is the first frame rate, the scan lines SL(1)-SL(N) receive the first gate driving signal (i.e., the first to $N^{th}$ stage shift register circuits 201(1)-201(N) of the first gate driving circuit GDC1 respectively provide first to $N^{th}$ stage gate driving signals to the scan lines SL(1)-SL(N)); when the frame rate of the display panel 10 is the second frame rate, the scan lines SL(1)-SL(N) receive the second gate driving signal (i.e., the first to $N^{th}$ stage shift register circuits 202(1)-202(N) of the second gate driving circuit GDC2 respectively provide first to $N^{th}$ stage gate driving signals to the scan lines SL(1)-SL(N)). Since a charging time of the pixel structure PX in one frame period is longer when driven at a lower frequency, charging efficiency of the transistor T1b (i.e., the second output transistor) of the output stage circuit 222 of the second gate driving circuit GDC2 may be lower than charging efficiency of the transistor T1a (i.e. the first output transistor) of the output stage circuit 221 of the first gate driving circuit GDC1, i.e., the driving capability of the transistor T1b may be lower than that of the transistor T1a, but the transistor T1b may still drive the scan lines SL(1)-SL(N) to a predetermined voltage when driven at the lower frequency. For example, the display panel 10 includes 300 scan lines, and when the frame rate is 60 Hz, the charging time of each scan line is about 55.5 μs; and when the frame rate is 8 Hz, the charging time of each scan line is about 416 μs. Therefore, when the frame rate is 8 Hz, the transistor T1b of the output stage circuit 222 of the second gate driving circuit GDC2 with lower driving capability may still drive the scan lines to the predetermined voltage.

Referring to FIG. 1 to FIG. 3B, the transistor T1a includes a gate GE1, a source SE1, a drain DE1 and a semiconductor pattern SC1, where the semiconductor pattern SC1 is located between the gate GE1 and the source SE1 (or drain DE1) in a front view direction and overlaps the gate GE1. The source SE1 and the drain DE1 are spaced apart from each other and respectively contact two different regions of the semiconductor pattern SC1. Similarly, the transistor T1b includes a gate GE2, a source SE2, a drain DE2 and a semiconductor pattern SC2, where the semiconductor pattern SC2 is located between the gate GE2 and the source SE2 (or drain DE2) in the front view direction and overlaps the gate GE2. The source SE2 and the drain DE2 are spaced apart from each other and respectively contact two different regions of the semiconductor pattern SC2.

It should be noted that a channel width CW1 of the transistor T1a of the output stage circuit 221 of the first gate driving circuit GDC1 may be larger than a channel width CW2 of the transistor T1b of the output stage circuit 222 of the second gate driving circuit GDC2. Accordingly, the display panel 10 may select an appropriate gate driving circuit to provide the gate driving signal under operation of different driving frequencies, so as to avoid waste of power consumption during operation of the gate driving circuit.

For example, when the display panel 10 is intended to operate at a lower scan frequency, the (output) transistor T1b with the smaller channel width CW2 may be selected to output the second gate driving signal to the scan lines SL(1)-SL(N), so as to reduce output power consumption of the gate driving signal. Conversely, when the display panel 10 is intended to operate at a higher scan frequency, the (output) transistor T1a with the larger channel width CW1 may be selected to output the first gate driving signal to the scanning lines SL(1)-SL(N) to meet the charging efficiency at high frequency driving.

Some other embodiments will be listed below to describe the disclosure in detail, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 4:
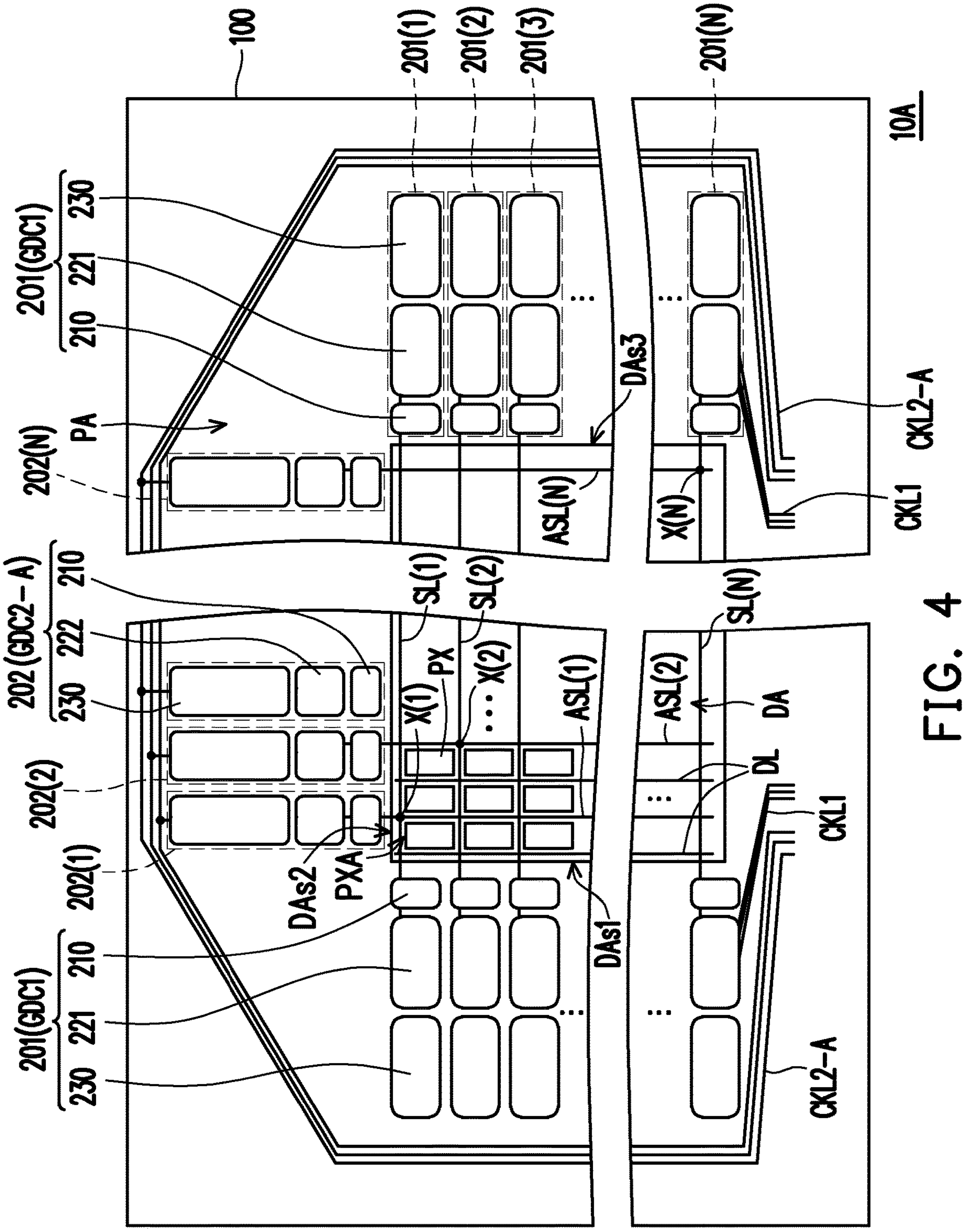
FIG. 4 is a schematic front view of a display panel according to a second embodiment of the disclosure.
Figure 5:
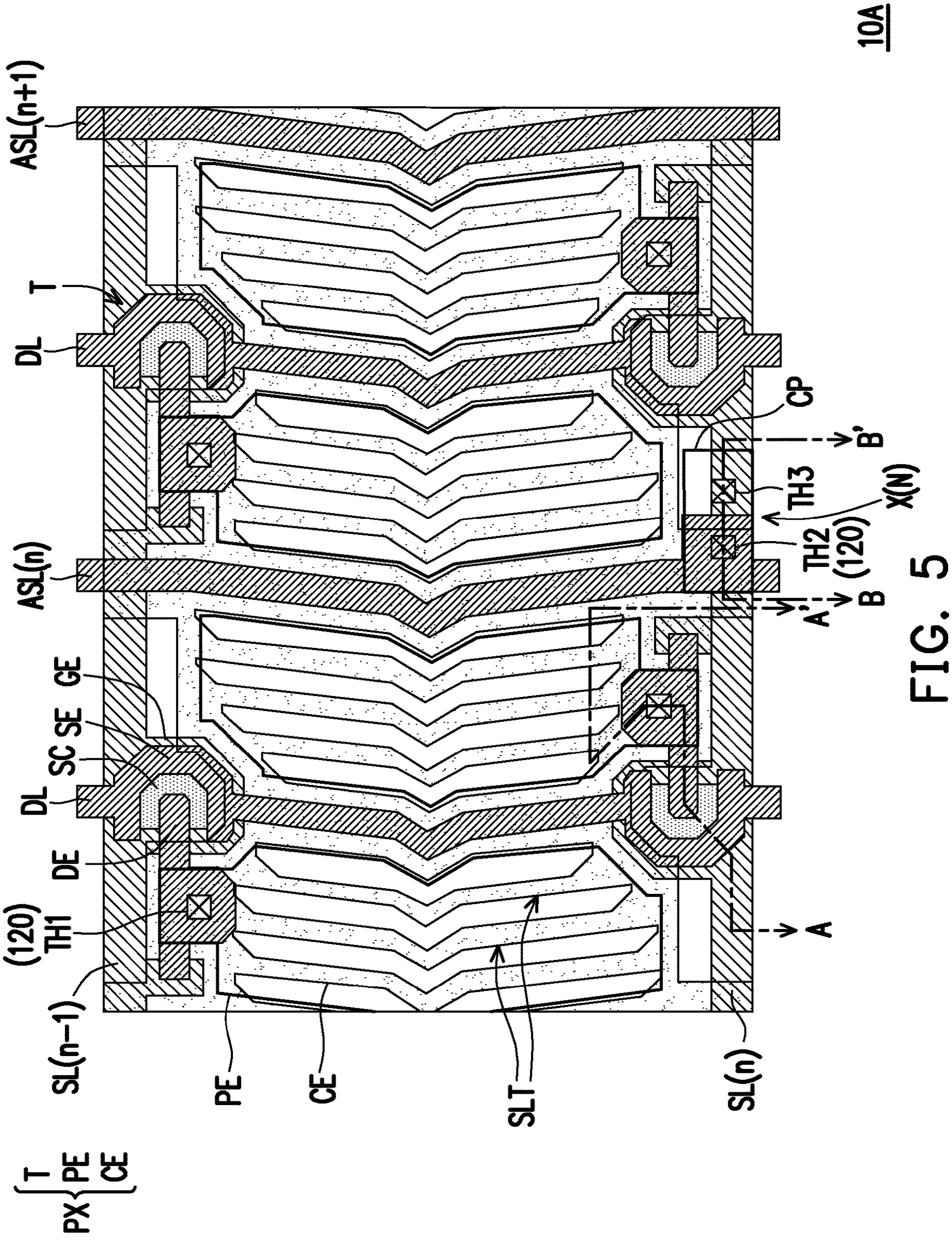
FIG. 5 is a schematic enlarged view of a display area of the display panel in FIG. 4.
Figure 6:
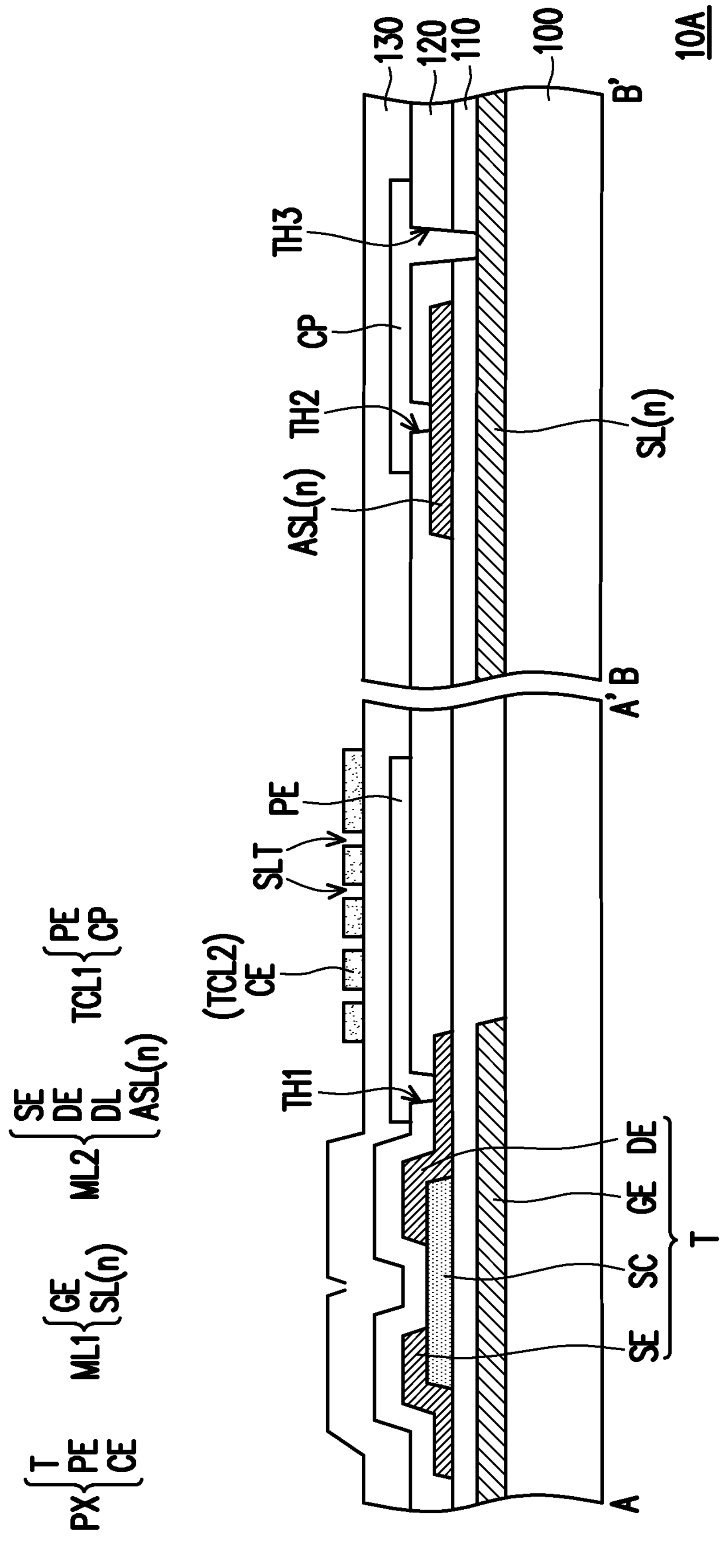
FIG. 6 is a schematic cross-sectional view of the display panel in FIG. 5.
Figure 7A:
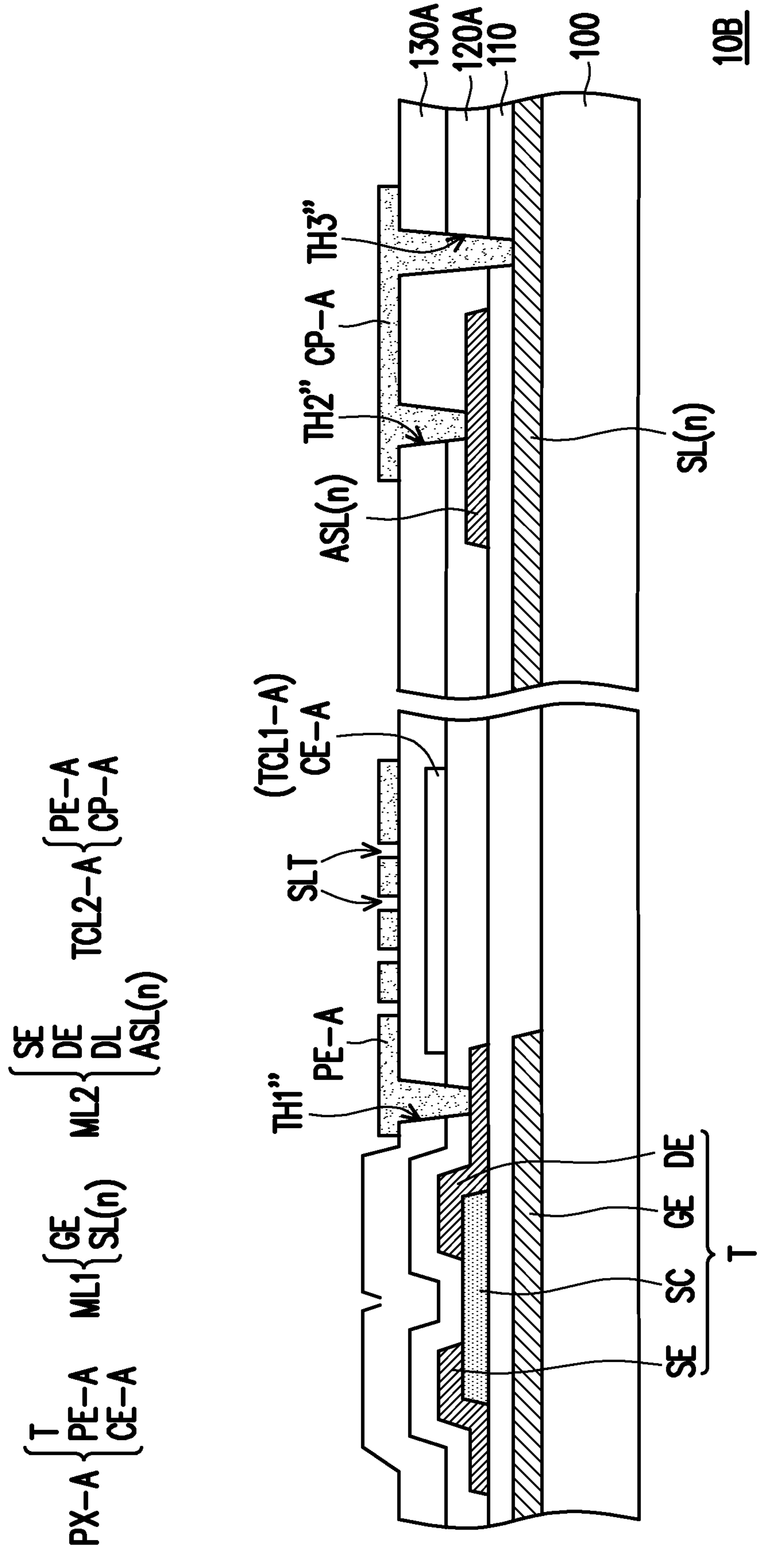
FIG. 7A and FIG. 7B are schematic cross-sectional views of some other varied embodiments of the display panel shown in FIG. 6.
Figure 7B:
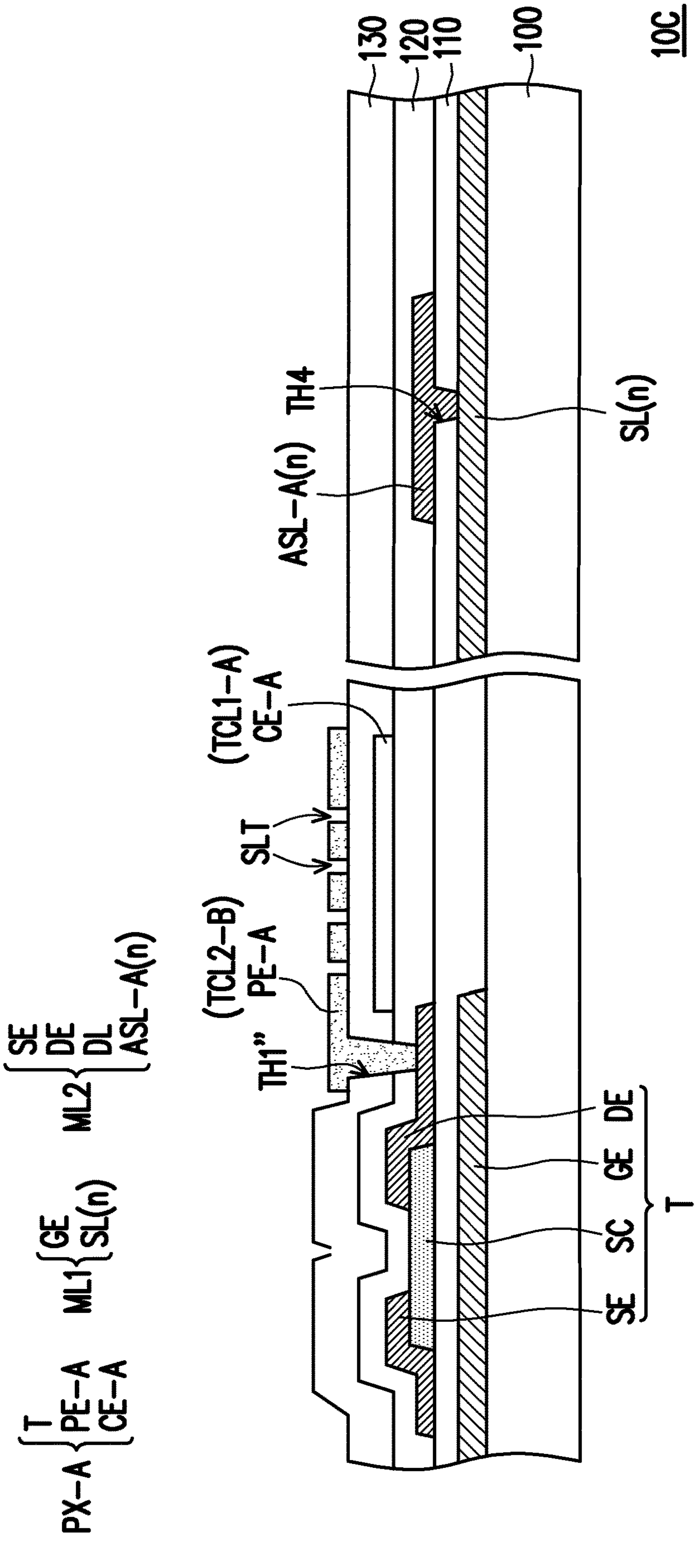

FIG. 4 is a schematic front view of a display panel according to a second embodiment of the disclosure. FIG. 5 is a schematic enlarged view of a display area of the display panel in FIG. 4. FIG. 6 is a schematic cross-sectional view of the display panel in FIG. 5. FIG. 7A and FIG. 7B are schematic cross-sectional views of some other varied embodiments of the display panel shown in FIG. 6. FIG. 6 corresponds to a section line A-A' and a section line B-B' of FIG. 5.

Referring to FIG. 4, different to the display panel 10 of FIG. 1 where the first gate driving circuit GDC1 and the second gate driving circuit GDC2 are arranged on two opposite sides of the display area DA, in a display panel 10A of the embodiment, the first gate driving circuit GDC1 and a second gate driving circuit GDC2-A are respectively located on two adjacent sides of the display area DA. For example, the first gate driving circuit GDC1 and the second gate driving circuit GDC2-A of the display panel 10A may be respectively arranged on a first side DAs1 of the display area DA (i.e., a left side of the display area DA in FIG. 4) and a second side Das2 of the display area DA (i.e., an upper side of the display area DA in FIG. 4), where the second side DAs2 is adjacent to the first side DAs1.

In addition, the display panel 10A may further include another first gate driving circuit GDC1 disposed on a third side DAs3 of the display area DA (i.e., a right side of the display area DA in FIG. 4), where the third side DAs3 is adjacent to the second side DAs2 and is opposite to the first side DAs1. In the embodiment, the first side DAs1 and the third side DAs3 of the display area DA are opposite to each other, and both ends of the second side DAs2 of the display area DA are respectively coupled to the first side DAs1 and the third side DAs3. Therefore, a second clock signal line CKL2-A of the embodiment extends to the upper side of the display area DA through the left and right sides of the display area DA.

In the embodiment, the two first gate driving circuits GDC1 are respectively located on two opposite sides of the display area DA, and are respectively electrically connected to two opposite ends of each of the scan lines SL(1)-SL(N). When the display panel 10A is intended to operate at a higher scan frequency, the two first gate driving circuits GDC1 may operate at a same clock frequency, thereby realizing dual-terminal driving of the display panel 10A, and improving the charging efficiency of the pixel structures PX.

In the embodiment, the respective two opposite ends of each of the scan lines SL(1)-SL(N) are electrically connected to the two first gate driving circuits GDC1 to realize the dual-terminal driving of the scan lines SL(1)-SL(N), but the disclosure is not limited thereto. In other embodiments, the two first gate driving circuits GDC1 are respectively located on the two opposite sides of the display area DA, and one of the two first gate driving circuits GDC1 is electrically connected to odd-numbered scan lines (such as SL(1), SL(3), SL(5) . . . etc.), and the other one of the two first gate driving circuits GDC1 is electrically connected to the even-numbered scan lines (such as SL(2), SL(4), SL(6) . . . etc.), where one of the two first gate driving circuits GDC1 receives the first clock signal CK1, and the other one of the two first gate driving circuits GDC1 receives another clock signal, and a frequency of the another clock signal is the same as that of the first clock signal CK1 and there is a phase difference there between.

In some other embodiments, the display panel 10A may include one first gate driving circuit GDC1 and two second gate driving circuits GDC2-A, the second gate driving circuit GDC2-A and the first gate driving circuit GDC1 may be respectively disposed on the first side DAs1 and the second side DAs2 of the display area DA, and the other second gate driving circuit GDC2-A may be disposed on the third side DAs3 of the display area DA. The two opposite ends of each of the scan lines SL(1)-SL(N) may be respectively electrically connected to the two second gate driving circuits GDC2-A, or the odd-numbered scan lines and the even-numbered scan lines in the scan lines SL(1)-SL(N) may be respectively electrically connected to one second gate driving circuit GDC2-A and another second gate driving circuit GDC2-A, where one of the two second gate driving circuits GDC2-A receives the second clock signal CK2, the other one of the two second gate driving circuits GDC2-A receives another clock signal, and frequencies of the aforementioned another clock signal and the second clock signal CK2 are the same and there is a phase difference there between.

In the embodiment, in order to allow a second gate driving signal generated by the second gate driving circuit GDC2-A on the upper side of the display area DA (i.e., the second side DAs2) to be transmitted to multiple scan lines SL, the display panel 10A of the embodiment further includes multiple auxiliary signal lines ASL(1)-ASL(N). These auxiliary signal lines ASL(1)-ASL(N) are electrically connected to the output stage circuits 222 of the first to $N^{th}$ stage shift register circuits 202(1)-202(N) of the second gate driving circuit GDC2-A and the scan lines SL(1)-SL(N), i.e., the auxiliary signal line ASL(n) is electrically connected to the output stage circuit 222 of the $n^{th}$ stage shift register circuit 202(*n*) of the second gate driving circuit GDC2-A and the scan line SL(n), so as to transmit the $n^{th}$ stage gate driving signal G2n output by the output stage circuit 222 of the $n^{th}$ stage shift register circuit 202(*n*) of the second gate driving circuit GDC2 to the scan line SL(n) through the corresponding auxiliary signal line ASL(n). In the embodiment, the auxiliary signal lines ASL(1)-ASL(N) intersect with the scan lines SL(1)-SL(N), and are alternately arranged with the data lines DL, but the disclosure is not limited thereto. The auxiliary signal line ASL(n) is electrically connected to the corresponding scan line SL(n) through a connection structure X(n). For example, the auxiliary signal lines ASL(1)-ASL(N) electrically connected to the first to $N^{th}$ stage shift register circuits 202(1)-202(N) in the second gate driving circuit GDC2-A are respectively electrically connected to the scan lines SL(1)-SL(N) via the connection structures X(1)-X(N). Regarding a schematic cross-sectional view of the connection structures X(1)-X(N), reference may be made to the descriptions of FIG. 5 to FIG. 7B.

It should be noted that, in the embodiment, the first scan direction signal U2D of the first gate driving circuit GDC1 is used to indicate that a scan direction of the first gate driving circuit GDC1 is the first direction (for example, the scan direction of the scan lines SL(1)-SL(N) in the display area DA is from the top to the bottom of FIG. 4), and the second scan direction signal D2U is used to indicate that the scan direction of the first gate driving circuit GDC1 is the second direction (for example, the scan direction of the scan lines SL(1)-SL(N) in the display area DA is from the bottom to the top of FIG. 4). The first scan direction signal U2D of the second gate driving circuit GDC2-A is used to indicate that the scan direction of the second gate driving circuit GDC2-A is a third direction (for example, from left to right in FIG. 4), and the second scan direction signal D2U is used to indicate that the scan direction of the second gate driving circuit GDC2-A is a fourth direction (for example, from the right to the left in FIG. 4), since the first to $N^{th}$ stage shift register circuits 202(1)-202(N) in the second gate driving circuit GDC2-A are respectively electrically connected to the scan lines SL(1)-SL(N) through the auxiliary signal lines ASL(1)-ASL(N), the first scan direction signal U2D of the second gate driving circuit GDC2-A is used to indicate that the scan direction of the scan lines SL(1)-SL(N) in the display area DA is, for example, from the top to the bottom of FIG. 4, and the second scan direction signal D2U is used to indicate that the scan direction of the scanning lines SL(1)-SL(N) in the display area DA is, for example, from bottom to top in FIG. 4.

Referring to FIG. 5 and FIG. 6, in the embodiment, the pixel structure PX may include a pixel transistor T, a pixel electrode PE and a common electrode CE. The pixel transistor T is electrically connected to a corresponding one of the scan lines SL(1)-SL(N) and a data line DL. The pixel electrode PE is electrically connected to the pixel transistor T. The common electrode CE is disposed by overlapping the pixel electrode PE. The pixel transistor T may include a gate GE, a source SE, a drain DE and a semiconductor pattern SC.

For example, the gate GE is optionally located between the semiconductor pattern SC and the substrate 100, and an insulating layer 110 is disposed between the gate GE and the semiconductor pattern SC. Namely, the pixel transistor T of the embodiment may be a bottom-gate thin film transistor, but the disclosure is not limited thereto. In other embodiments, the pixel transistor may also be a top-gate thin film transistor.

In the embodiment, the source SE and the drain DE respectively cover two different regions of the semiconductor pattern SC, and another insulating layer 120 is covered thereon. The pixel electrode PE may be disposed on the insulating layer 120 and electrically connected to the drain DE of the pixel transistor T through a through hole TH1 of the insulating layer 120. In the embodiment, the pixel electrode PE is optionally located between the common electrode CE and the substrate 100, and an insulating layer 130 may be disposed between the pixel electrode PE and the common electrode CE, but the disclosure is not limited thereto. In the embodiment, the common electrode CE may have multiple micro-slits SLT, and these micro-slits SLT are arranged by overlapping the pixel electrode PE.

In the embodiment, the gate GE of the pixel transistor T and the scanning lines SL(1)-SL(N) may belong to a same film layer (such as a first metal layer ML1), and the drain DE, the source SE of the pixel transistor T and the auxiliary signal line ASL(1)-ASL(N) may belong to a same film layer (such as a second metal layer ML2), but the disclosure is not limited thereto. In some embodiments, the auxiliary signal lines ASL(1)-ASL(N) and the drain DE and source SE of the pixel transistor T may belong to different film layers.

In order to electrically connect each auxiliary signal line ASL(n) to a corresponding scan line SL(n), the display panel 10A may further include multiple conductive patterns CP, where the auxiliary signal lines ASL(1)-ASL(N) are electrically connected to the scan lines SL(1)-SL(N) respectively via the conductive patterns CP. In detail, the conductive patterns CP respectively overlap intersections of the scan lines SL(1)-SL(N) and the auxiliary signal lines ASL(1)-ASL(N). The conductive pattern CP may be electrically connected to the auxiliary signal line ASL(n) through a through hole TH2 of the insulating layer 120, and may be electrically connected to the scan line SL(n) through a through hole TH3 of the insulating layer 110 and the insulating layer 120. Specifically, in the embodiment, the connection structure X(n) mentioned above includes the conductive pattern CP and the through holes TH2, TH3, and each auxiliary signal line ASL(n) is electrically connected to the corresponding scan line SL(n) through the corresponding connection structure X(n). In the embodiment, the conductive pattern CP and the pixel electrode PE may belong to a same film layer (for example, a first transparent conductive layer TCL1), while the common electrode CE belongs to a second transparent conductive layer TCL2, but the disclosure is not limited thereto. In other embodiments, the conductive pattern CP and the common electrode CE may belong to a same film layer, and the conductive pattern CP may be electrically connected to an overlapping auxiliary signal line ASL(n) via the through hole of the insulating layer 120 and the insulating layer 130, and is electrically connected to an overlapping scan line SL(n) via the through hole of the insulating layer 110, the insulating layer 120 and the insulating layer 130.

However, the disclosure is not limited thereto. Referring to FIG. 7A, in another varied embodiment, a common electrode CE-A of a pixel structure PX-A may be disposed between a pixel electrode PE-A and the substrate 100. More specifically, the common electrode CE-A may be disposed on an insulating layer 120A, and an insulating layer 130A is disposed between the common electrode CE-A and the pixel electrode PE-A. The pixel electrode PE-A may be electrically connected to the drain DE of the pixel transistor T through a through hole TH1" of the insulating layer 120A and the insulating layer 130A.

Namely, the common electrode CE-A of the embodiment may belong to the first transparent conductive layer TCL1-A, and the pixel electrode PE-A may belong to a second transparent conductive layer TCL2-A. It should be noted that, in a display panel 10B of FIG. 7A, a conductive pattern CP-A optionally belongs to the second transparent conductive layer TCL2-A. The conductive pattern CP-A may be electrically connected to an overlapping auxiliary signal line ASL(n) through a through hole TH2" of the insulating layer 120A and the insulating layer 130A, and electrically connected to an overlapping scanline SL(n) through a through hole TH3" of the insulating layer 110, the insulating layer 120A and the insulating layer 130A. To be specific, in this varied embodiment, the connection structure X(n) mentioned above includes the conductive pattern CP-A and the through holes TH2", TH3", and each auxiliary signal line ASL(n) is electrically connected to the corresponding scan line SL(n) through the corresponding connection structure X(n). In some other embodiments, the conductive pattern CP-A and the common electrode CE-A may belong to a same film layer, and the conductive pattern CP-A may be electrically connected to an overlapping auxiliary signal line ASL(n) through the through hole of the insulating layer 120A, and electrically connected to an overlapping scan line SL(n) through the through hole of the insulating layer 110 and the insulating layer 120A.

Referring to FIG. 7B, in yet another varied embodiment, a second transparent conductive layer TCL2-B of a display panel 10C is not formed with the conductive pattern CP-A shown in FIG. 7A. Instead, the auxiliary signal lines ASL-A(n) may be directly electrically connected to an overlapping scan line SL through a through hole TH4 of the insulating layer 110. Specifically, in the varied embodiment, the connection structure X(n) mentioned above includes the through hole TH4, and each auxiliary signal line ASL(n) is electrically connected to the corresponding scan line SL(n) through the corresponding connection structure X(n).

The above-mentioned varied embodiment where the display panel includes one first gate driving circuit GDC1 disposed on the second side DAs2 of the display area DA and two second gate driving circuits GDC2-A respectively disposed on the first side DAs1 and the third side DAs3 of the display area DA, the scan lines SL(1)-SL(N) are electrically connected to the first gate driving circuit GDC1 through the connection structures X(1)-X(n) and the auxiliary signal lines ASL(1)-ASL(n), respectively, and two opposite ends of each of the scan lines SL(1)-SL(N) are respectively electrically connected to the two second gate driving circuits GDC2-A, or the odd-numbered scan lines and the even-numbered scan lines among the scan lines SL(1)-SL(N) are respectively electrically connected to one second gate driving circuit GDC2-A and another second gate driving circuit GDC2-A.

Figure 8:
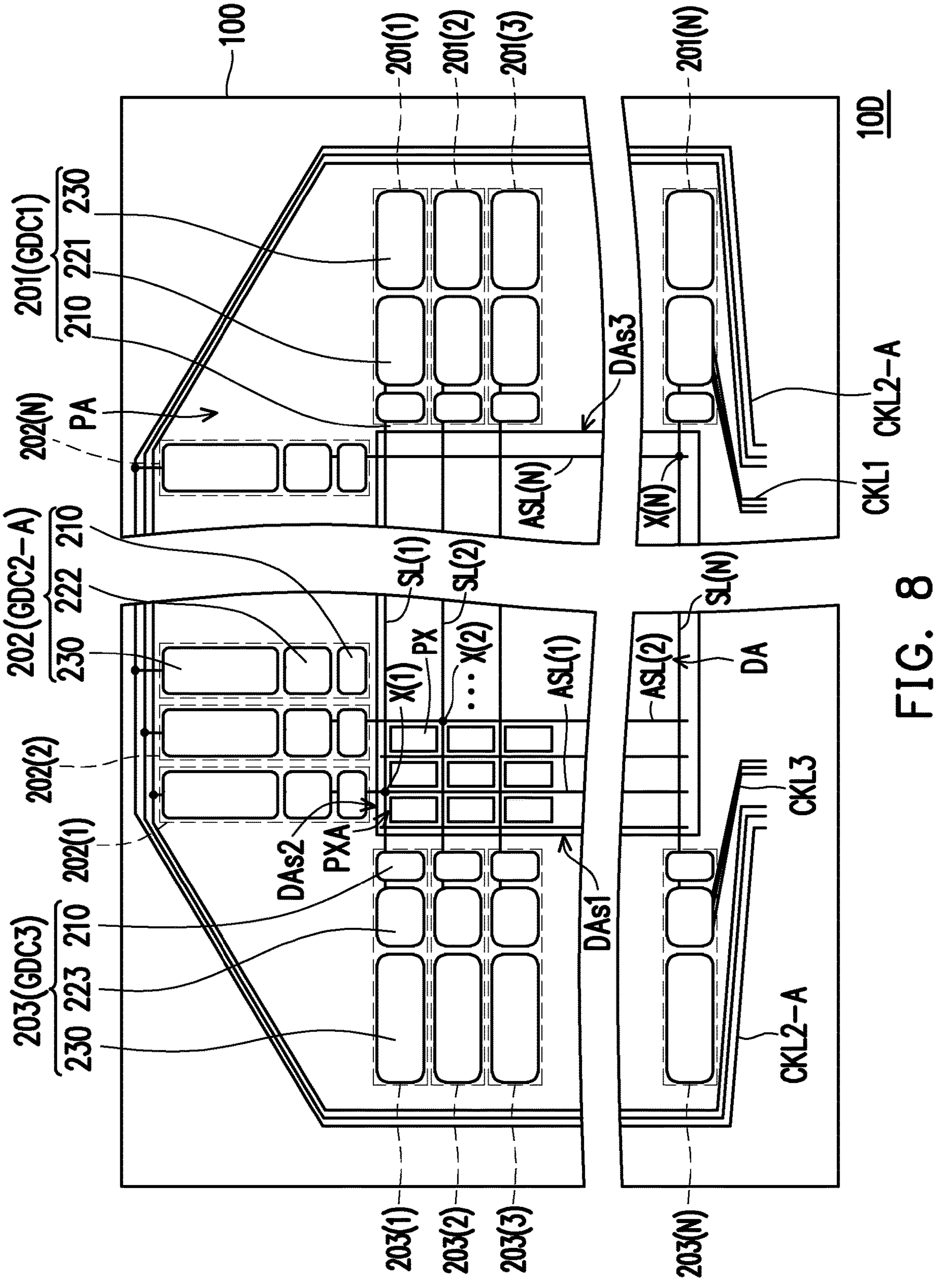
FIG. 8 is a schematic front view of a display panel according to a third embodiment of the disclosure.
Figure 9:
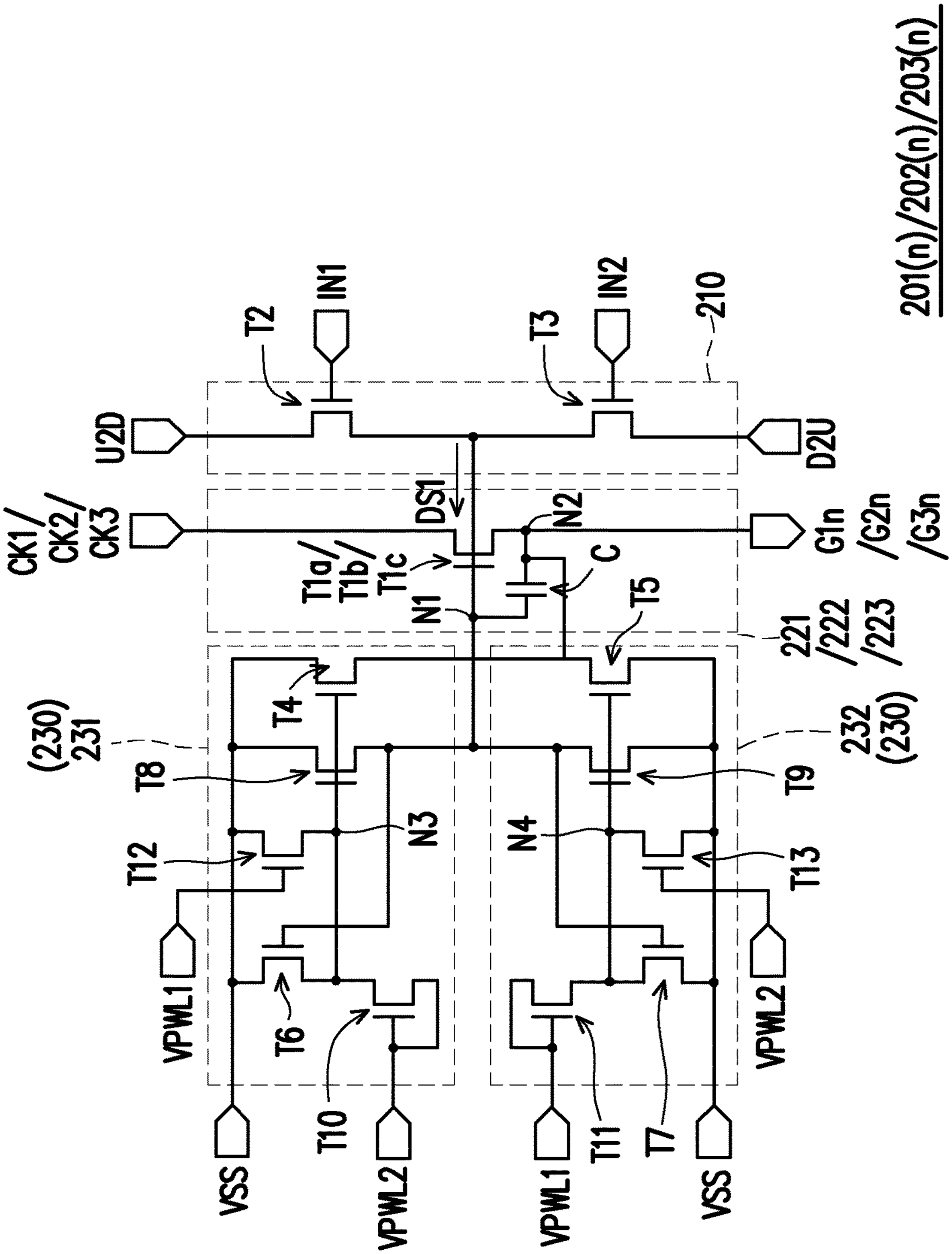
FIG. 9 is a schematic circuit diagram of a shift register circuit in FIG. 8.
Figure 10A:
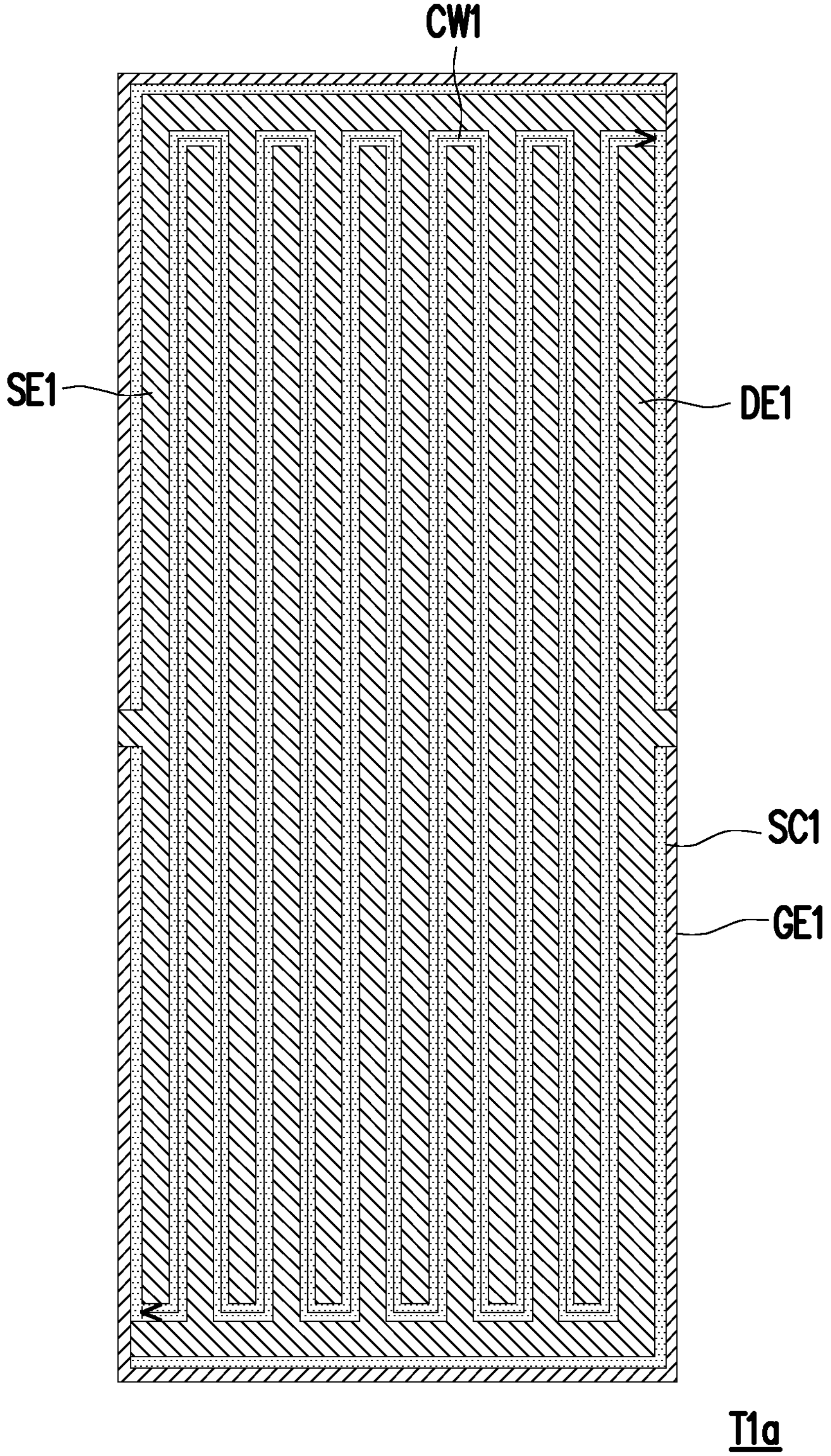
FIG. 10A to FIG. 10C are schematic front views of a first output transistor of a first output stage circuit, a second output transistor of a second output stage circuit, and a third output transistor of a third output stage circuit of FIG. 8.
Figure 10B:
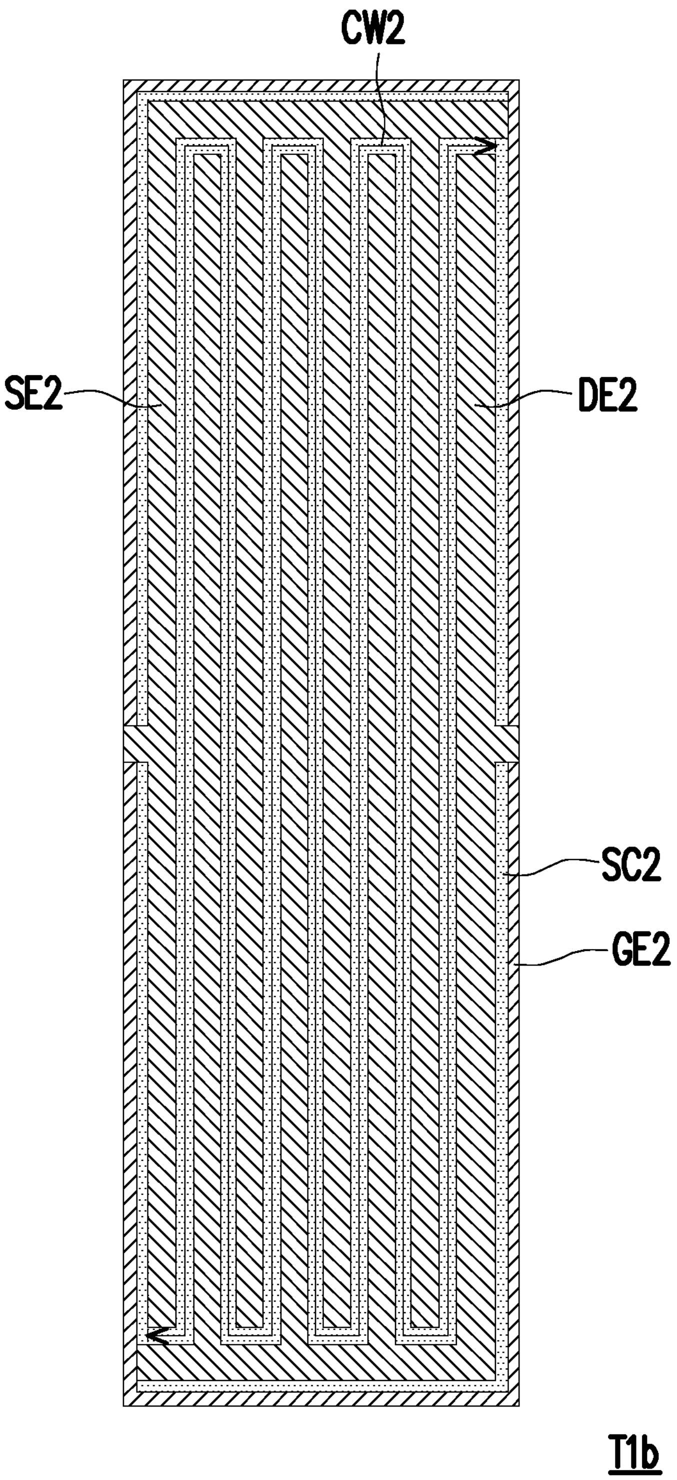
Figure 10C:
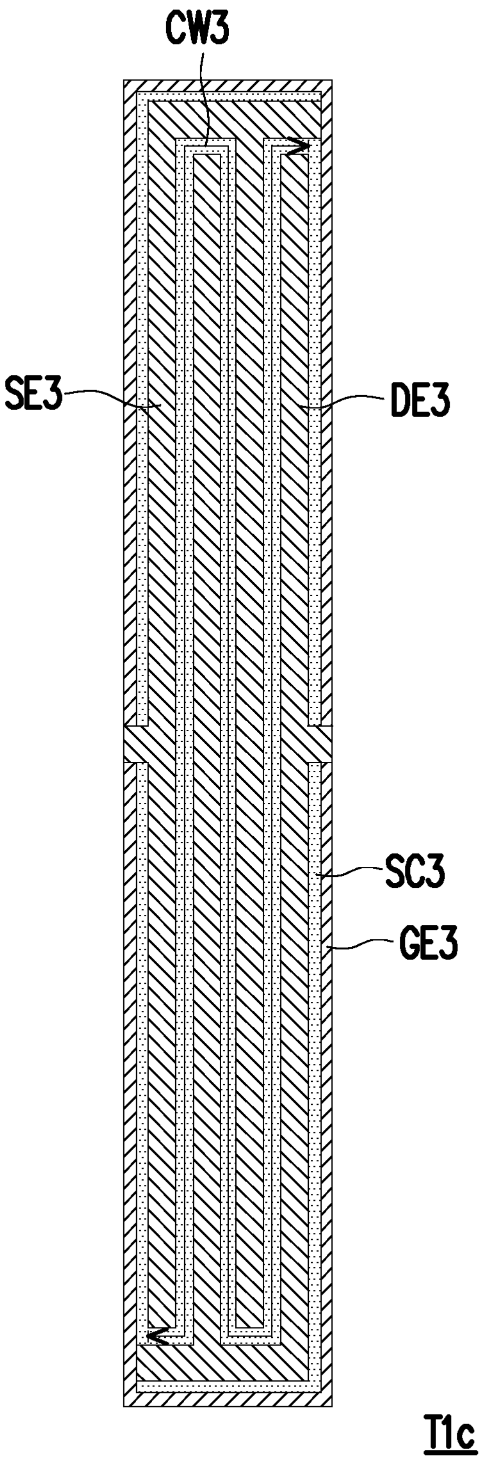

FIG. 8 is a schematic front view of a display panel according to a third embodiment of the disclosure. FIG. 9 is a schematic circuit diagram of a shift register circuit in FIG. 8. FIG. 10A to FIG. 10C are schematic front views of a first output transistor of a first output stage circuit, a second output transistor of a second output stage circuit, and a third output transistor of a third output stage circuit of FIG. 8. Referring to FIG. 8, a difference between a display panel 10D of the embodiment and the display panel 10A of FIG. 4 is that in the display panel 10D of FIG. 8, a third gate driving circuit GDC3 is used to replace one of the first gate driving circuits GDC1 of the display panel 10A of FIG, for example, the first gate driving circuit GDC1 located on the first side DAs1 of the display area DA in FIG. 4. Correspondingly, the display panel 10D of the embodiment is further provided with multiple third clock signal lines CKL3 electrically connected to the third gate driving circuit GDC3 in the peripheral area PA.

In the embodiment, the first gate driving circuit GDC1, the second gate driving circuit GDC2-A and the third gate driving circuit GDC3 of the display panel 10D are respectively arranged on the third side DAs3, the second side DAs2 and the first side DAs1 of the display area DA, the scan lines SL(1)-SL(N) are respectively electrically connected to the second gate driving circuit GDC2-A disposed on the second side DAs2 of the display area DA through the connection structure X(1)-X(n) and the auxiliary signal lines ASL(1)-ASL(n), and two opposite ends of each of the scan lines SL(1)-SL(N) are respectively electrically connected to the third gate driving circuit GDC3 disposed on the first side DAs1 of the display area DA and the first gate driving circuit GDC1 disposed on the third side DAs3 of the display area DA, but the disclosure is not limited thereto. The disclosure may adjust locations of the first gate driving circuit GDC1, the second gate driving circuit GDC2-A and the third gate driving circuit GDC3 according to actual requirements, i.e., one, another, and the other of the first gate driving circuit GDC1, the second gate driving circuit GDC2-A, and the third gate driving circuit GDC3 of the display panel may be respectively disposed on the first side DAs1, the second side DAs2 and the third side DAs3 of the display area DA. The scan lines SL(1)-SL(N) are respectively electrically connected to the gate driving circuit disposed on the second side DAs2 of the display area DA through the connection structures X(1)-X(n) and the auxiliary signal lines ASL(1)-ASL (n), and the two opposite ends of each of the scan lines SL(1)-SL(N) are respectively electrically connected to the gate driving circuit disposed on the first side DAs1 of the display area DA and the gate driving circuit disposed on the third side Das3 of the display area DA.

Similar to the first gate driving circuit GDC1 and the second gate driving circuit GDC2-A, the third gate driving circuit GDC3 includes first to $N^{th}$ stage shift register circuits 203(1)-203(N), and each of the first to $N^{th}$ stage shift register circuits 203 (1)-203 (N) may include a precharge circuit 210, an output stage circuit 223 and a pull-down circuit 230. The output stage circuits 223 of the first to $N^{th}$ stage shift register circuits 203(1)-203(N) of the third gate driving circuit GDC3 are electrically connected to the scan lines SL(1)-SL (N) and multiple third clock signal lines CKL3.

Referring to FIG. 8 and FIG. 9, these output stage circuits 223 are adapted to receive a third clock signal CK3 from the third clock signal lines CKL3, and output multiple third gate driving signals to the scanning lines SL (1)-SL(N).

Since the circuit structures of the first gate driving circuit GDC1 and the second gate driving circuit GDC2-A of the embodiment are similar to those of the first gate driving circuit GDC1 and the second gate driving circuit GDC2 in the embodiment of FIG. 1, for detailed description thereof, reference may be made to relevant paragraphs of the aforementioned embodiments, which are not repeated here.

Similar to the first gate driving circuit GDC1 and the second gate driving circuit GDC2-A, the precharge circuit 210 of the $n^{th}$ stage shift register circuit 203(*n*) of the third gate driving circuit GDC3 of the embodiment includes a transistor T2 and a transistor T3. A control terminal of the transistor T2 receives the first input signal IN1, a first terminal of the transistor T2 receives the first scan direction signal U2D, and a second terminal of the transistor T2 is connected to a second terminal of the transistor T3. The first input signal IN1 may be, for example, a first direction scan start signal or a gate driving signal output by a shift register circuit before the $n^{th}$ stage shift register circuit 203(*n*) (for example, but not limited to, an $(n-1)^{th}$ stage gate driving signal output by the previous stage shift register circuit 203(*n*−1)). A control terminal of the transistor T3 receives the second input signal IN2, and a first terminal of the transistor T3 receives the second scan direction signal D2U. The second input signal IN2 may be, for example, a second direction scan start signal or a gate driving signal output by a shift register circuit after the $n^{th}$ stage shift register circuit 203(*n*) (for example, but not limited to, an $(n+1)^{th}$ stage gate driving signal output by the next stage shift register circuit 203(*n*+1)).

In the embodiment, the first scan direction signal U2D is used to indicate that a scan direction of the third gate driving circuit GDC3 is the first direction (for example, from the top to the bottom in FIG. 8), and the second scan direction signal D2U is used to indicate that the scan direction of the third gate driving circuit GDC3 is the second direction (for example, from the bottom to the top in FIG. 8).

The output stage circuit 223 of the $n^{th}$ stage shift register circuit 203(*n*) of the third gate driving circuit GDC3 includes a transistor T1c and a capacitor C. A control terminal of the transistor T1c is electrically connected to the first node N1, a first terminal of the transistor T1c receives the third clock signal CK3 from the third clock signal line CKL3, and a control terminal and a second terminal of the transistor T1c are respectively connected to a first terminal and a second terminal of the capacitor C, the second terminal of the transistor T1c is electrically connected to the second node N2, and the second terminal of the transistor T1c outputs the $n^{th}$ stage gate driving signal G3n (i.e., the third gate driving signal) to the corresponding scan line SL(n).

Since the pull-down circuit 230 of the third gate driving circuit GDC3 is similar to that of the first gate driving circuit GDC1 and the second gate driving circuit GDC2 of the embodiment in FIG. 1, for detailed description thereof, reference may be made to the relevant paragraphs of the foregoing embodiments, which are not repeated here.

In particular, in the embodiment, the display panel 10D may be driven at three different scan frequencies. For example, a frequency of the first clock signal CK1 may be greater than a frequency of the second clock signal CK2, and the frequency of the second clock signal CK2 may be greater than a frequency of the third clock signal CK3. Each scan line SL(n) is electrically connected to the $n^{th}$ shift register circuit 201(*n*) of the first gate driving circuit GDC1, the $n^{th}$ shift register circuit 202(*n*) of the second gate driving circuit GDC2-A and the $n^{th}$ stage shift register circuit 203(*n*) of the third gate driving circuit GDC3, when the display panel 10D is to be driven at a first scan frequency (or may be referred to as a first frame rate), the first gate driving circuit GDC1 is used to provide the first gate driving signal to the scan lines SL(1)-SL(N). On the contrary, when the display panel 10D is to be driven at a second scan frequency (or may be referred to as a second frame rate) lower than the first scan frequency, the second gate driving circuit GDC2-A is used to provide the second gate driving signal to the scan lines SL(1)-SL(N). When the display panel 10D is to be driven at a third scan frequency (or may be referred to as a third frame rate) lower than the second scan frequency, the third gate driving circuit GDC3 may be used to provide a third gate driving signal to the scan lines SL (1)-SL(N). In the embodiment, the first frame rate is greater than the second frame rate, and the second frame rate is greater than the third frame rate.

Since when driving at the third frame rate, a charging time of the pixel structure PX within one frame period is longer than a charging time when driving at the first frame rate or the second frame rate, charging efficiency of the transistor T1c (i.e., the third output transistor) of the output stage circuit 223 of the third gate driving circuit GDC3 may be lower than that of the transistor T1b (i.e., the first output transistor) of the output stage circuit 222 of the second gate driving circuit GDC2-A and the transistor T1a (i.e., the second output transistor) of the output stage circuit 221 of the first gate driving circuit GDC1, and the scan lines SL(1)-SL(N) may still be driven to a predetermined voltage.

Referring to FIG. 8 to FIG. 10C, since the structures of the transistor T1a and the transistor T1b in the embodiment are similar to that of the transistor T1a and the transistor T1b in FIG. 3A and FIG. 3B, for detailed descriptions thereof, reference may be made to related paragraphs of the aforementioned embodiment, which are not repeated. Similar to the transistor T1a and the transistor T1b, the transistor T1c includes a gate GE3, a source SE3, a drain DE3 and a semiconductor pattern SC3, where the semiconductor pattern SC3 is located between the gate GE3 and the source SE3 (or the drain DE3) in the front view direction and overlap the gate GE3. The source SE3 and the drain DE3 are spaced apart from each other and contact two different regions of the semiconductor pattern SC3 respectively.

In particular, the channel width CW1 of the transistor T1a of the output stage circuit 221 of the first gate driving circuit GDC1 may be greater than the channel width CW2 of the transistor T1b of the output stage circuit 222 of the second gate driving circuit GDC2-A, and a channel width CW3 of the transistor T1c of the output stage circuit 223 of the third gate driving circuit GDC3 may be smaller than the channel width CW2 of the transistor T1b of the output stage circuit 222 of the second gate driving circuit GDC2-A. Accordingly, the display panel 10D may select an appropriate gate driving circuit to provide the gate driving signal under operations of different driving frequencies, so as to avoid waste of power consumption during operation of the gate driving circuit.

Figure 11:
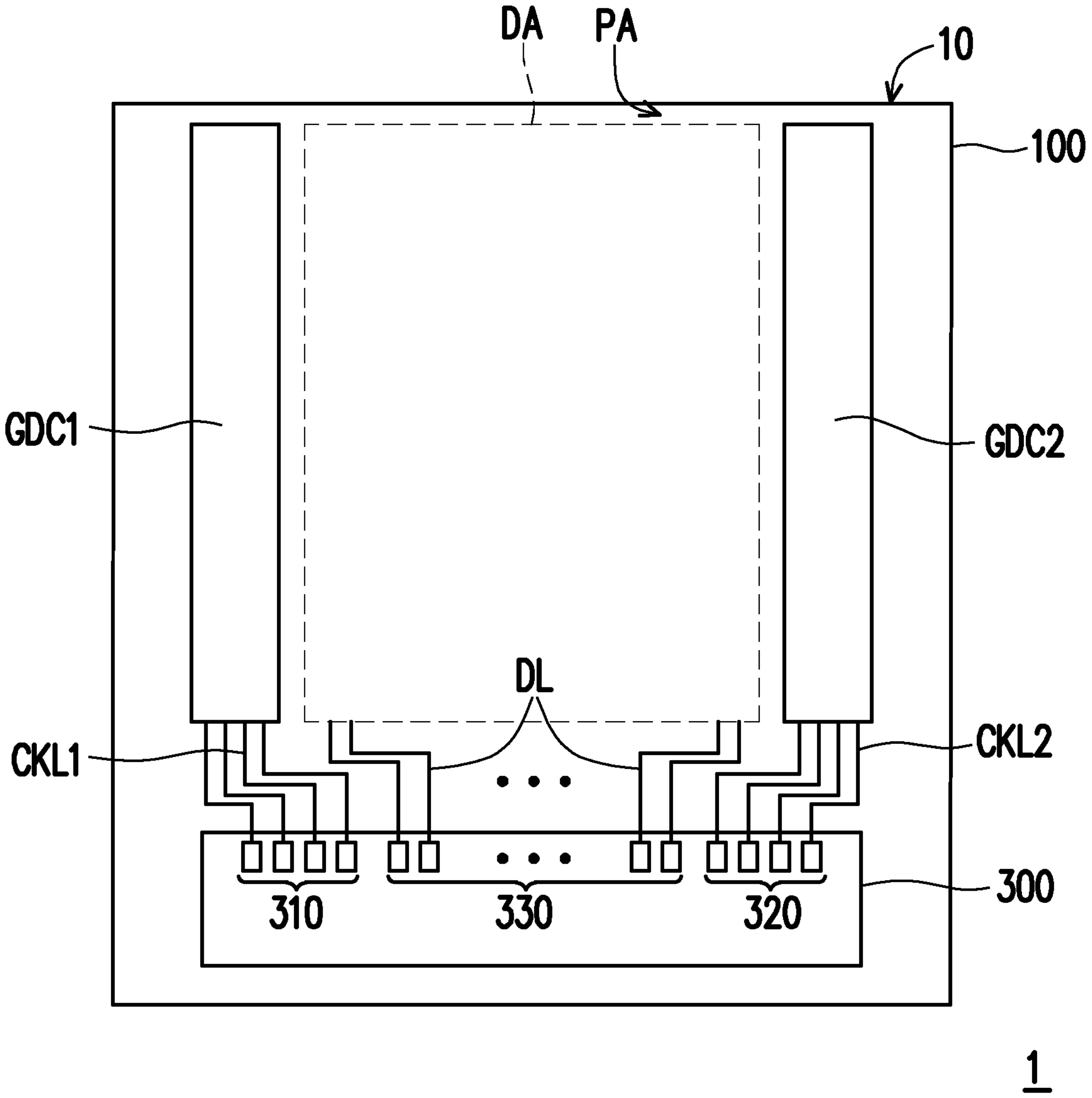
FIG. 11 is a schematic front view of a display device according to a fourth embodiment of the disclosure.
Figure 12:
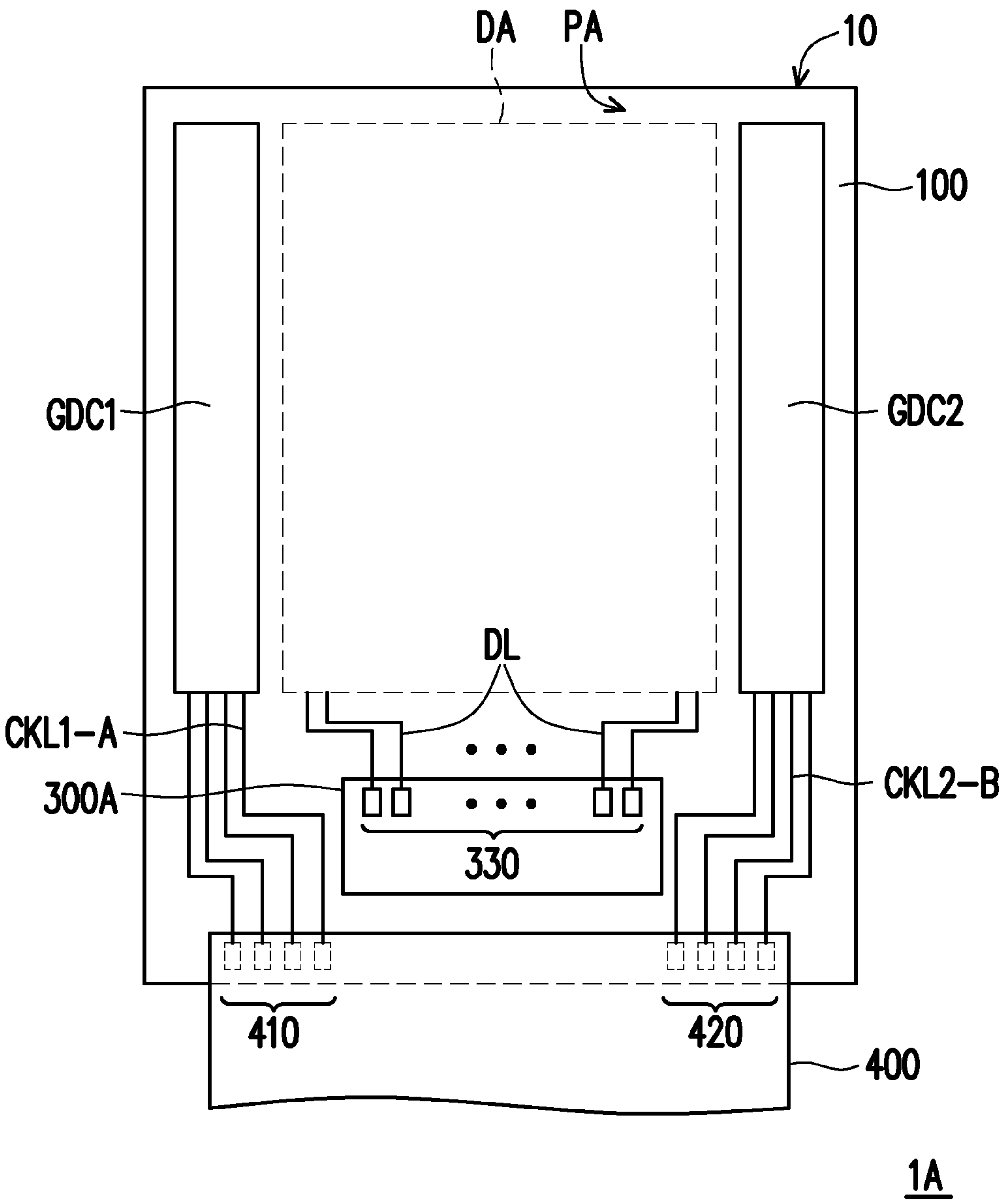
FIG. 12 is a schematic front view of a display device according to a fifth embodiment of the disclosure.
Figure 13:
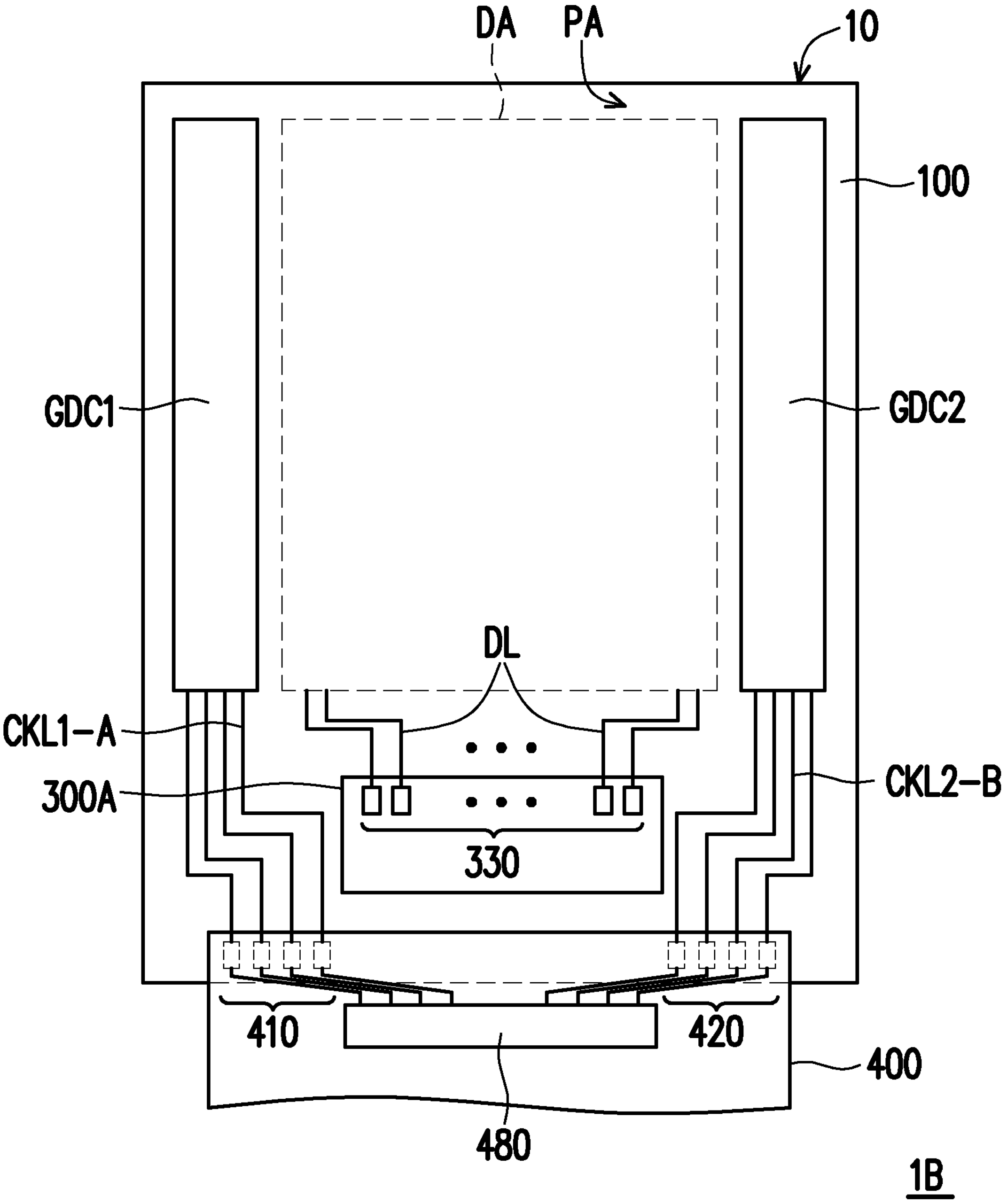
FIG. 13 is a schematic front view of a display device according to a sixth embodiment of the disclosure.

FIG. 11 is a schematic front view of a display device according to a fourth embodiment of the disclosure. FIG. 12 is a schematic front view of a display device according to a fifth embodiment of the disclosure. FIG. 13 is a schematic front view of a display device according to a sixth embodiment of the disclosure.

Referring to FIG. 11, a display device 1 may include the display panel 10 of FIG. 1 and a driving chip 300. The driving chip 300 is disposed on the substrate 100 of the display panel 10 and located in the peripheral area PA. In the embodiment, the driver chip 300 has multiple first signal pins 310, multiple second signal pins 320 and multiple third signal pins 330. The first signal pins 310, the second signal pins 320, and the third signal pins 330 are electrically connected to multiple pads (not shown) provided on the substrate 100 of the display panel 10, and the pads are respectively electrically connected to the data lines DL, the first clock signal lines CKL1 and the second clock signal lines CKL2. The first clock signal lines CKL1 are electrically coupled to the first signal pins 310. The second clock signal lines CKL2 are electrically coupled to the second signal pins 320. The data lines DL are electrically coupled to the third signal pins 330. For example, the driving chip 300 may include a source driving circuit (not shown) and a signal generating circuit (not shown), where the source driving circuit is used to provide image signals (such as but not limited to grayscale signals) to the data line DL, the signal generating circuit is used to generate signals required by the first gate driving circuit GDC1 and the second gate driving circuit GDC2 (such as but not limited to clock signals required by the first gate driving circuit GDC1 and the second gate driving circuit GDC2). In particular, in FIG. 11 and the subsequent FIG. 12 and FIG. 13, illustration of multiple scanning lines electrically connected to the first gate driving circuit GDC1 and the second gate driving circuit GDC2 arranged in the display area DA is omitted. The aforementioned embodiments may be referred for the omitted part.

However, the disclosure is not limited thereto. Referring to FIG. 12, in another embodiment, a driving chip 300A has multiple third signal pins 330, and multiple data lines DL are electrically coupled to the third signal pins 330. For example, the driving chip 300A may include a source driving circuit (not shown), and the source driving circuit is used to provide image signals to the data lines DL. The driving chip 300A of a display device 1A is not electrically coupled to the first clock signal lines CKL1-A and the second clock signal lines CKL2-B. More specifically, the driving chip 300A does not have the first signal pins 310 and the second signal pins 320 shown in FIG. 11.

Instead, the display device 1A further includes a flexible circuit board 400 electrically connected to the peripheral area PA of the substrate 100. In the embodiment, the circuit board 400 has multiple first signal pins 410 and multiple second signal pins 420. The first signal pins 410 and the second signal pins 420 are electrically connected to multiple pads (not shown) provided on the substrate 100 of the display panel 10, and the pads are respectively electrically connected to the first clocks signal lines CKL1-A and the second clock signal lines CKL2-B. The first clock signal lines CKL1-A are electrically coupled to the flexible circuit board 400 through the first signal pins 410. The second clock signal lines CKL2-B are electrically coupled to the flexible circuit board 400 through the second signal pins 420. Therefore, in the embodiment, the signal generating circuit used to generate the signals required for the first gate driving circuit GDC1 and the second gate driving circuit GDC2 (such as but not limited to the clock signals required by the first gate driving circuit GDC1 and the second gate driving circuit GDC2) may be disposed on the flexible circuit board 400 or on a circuit board (or system board) electrically connected to the flexible circuit board 400.

Referring to FIG. 13, in the embodiment, the flexible circuit board 400 may also be provided with a voltage level shifter circuit 480, and the first clock signal lines CKL1-A are electrically coupled to the voltage level shifter circuit 480 through the first signal pins 410, and the second clock signal lines CKL2-B are electrically coupled to the voltage level shifter circuit 480 through the second signal pins 420. The voltage level shifter circuit 480 is, for example, a part of the aforementioned signal generating circuit. Through the disposition of the voltage level shifter circuit 480, when a display device 1B switches the operating frequency, the gate driving circuit which is not in use will not be powered, so that there will be no extra power consumption. In a varied embodiment, the voltage level shifter circuit 480 may also be disposed on a circuit board (or system board) electrically connected to the flexible circuit board 400.

In some other embodiments, the display panel 10 of the display devices 1, 1A, 1B may be replaced by the display panel 10A of FIG. 4 or the display panel of the varied embodiment of FIG. 4, for the detailed description of the remaining parts, reference may be made to the relevant paragraphs of the aforementioned embodiment in FIG. 4 and the varied embodiment, and details thereof are not repeated here.

Figure 14:
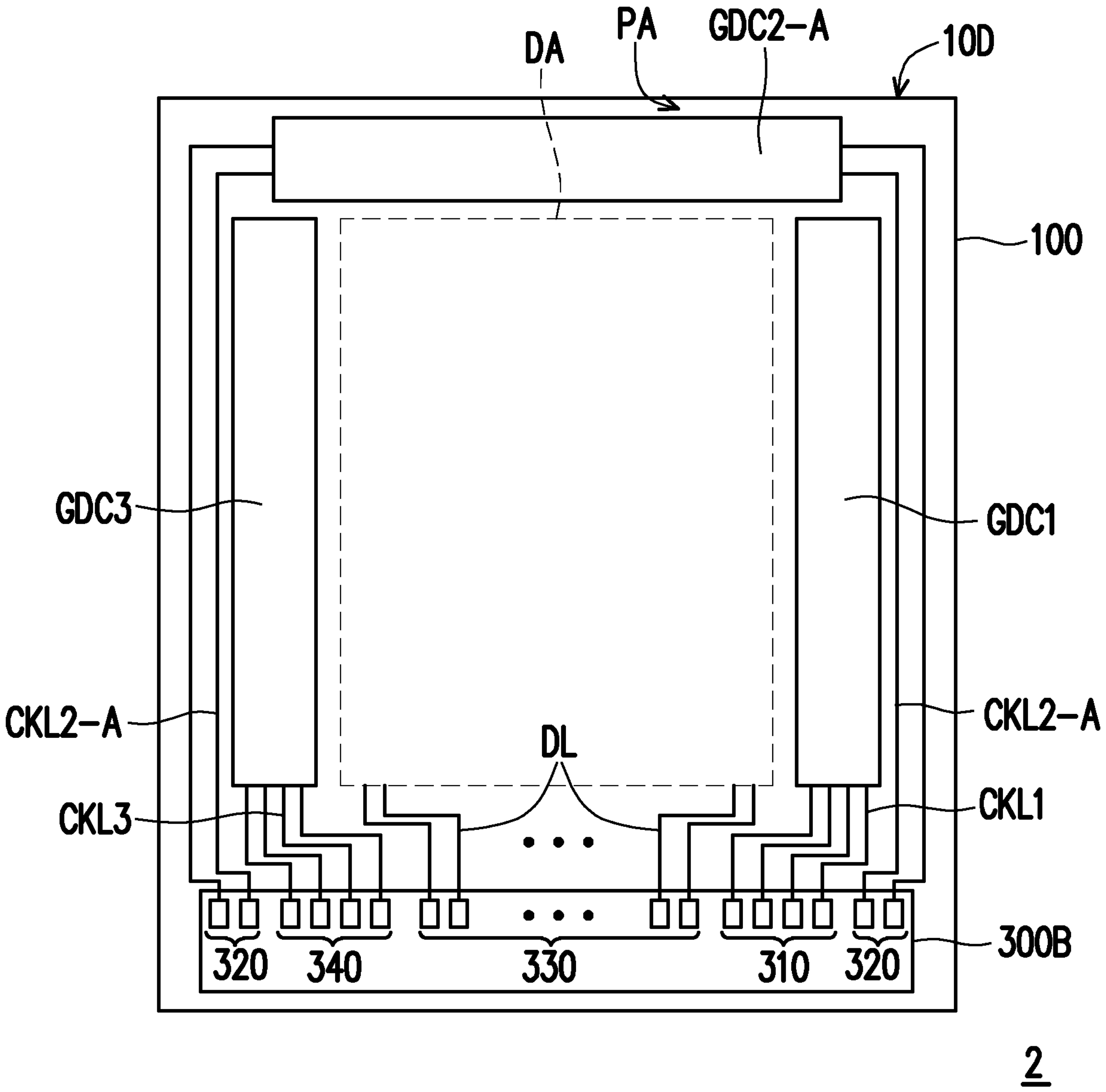
FIG. 14 is a schematic front view of a display device according to a seventh embodiment of the disclosure.

In the embodiments shown in FIG. 11, FIG. 12 and FIG. 13, the clock signal line may be electrically connected to the driving chip provided on the display panel, and the driving chip includes a signal generating circuit for generating the clock signals required by the gate driving circuits (as shown in the embodiment of FIG. 11), or the clock signal lines may be electrically connected to the flexible circuit board, and the signal generating circuit used to generate the clock signals required by the gate driving circuits may be disposed on the flexible circuit board or disposed on a circuit board (or system board) electrically connected with the flexible circuit board (as shown in the embodiments of FIG. 12 and FIG. 13). The electrical connection method of the clock signal lines similar to that shown in FIG. 11 and FIG. 12 may also be applied to a display device including the display panel 10D shown in FIG. 8. FIG. 14 exemplifies that the electrical connection method of the clock signal line similar to that shown FIG. 11 is applied to the display device including the display panel 10D of FIG. 8.

FIG. 14 is a schematic front view of a display device according to a seventh embodiment of the disclosure. Referring to FIG. 14, different from the display device 1 in FIG. 11 with the display panel 10 as a main structure, a display device 2 in the embodiment uses the display panel 10D in FIG. 8 as the main structure. Namely, the display device 2 has the first gate driving circuit GDC1, the second gate driving circuit GDC2-A, and the third gate driving circuit GDC3. Correspondingly, a driving chip 300B of the embodiment further has multiple fourth signal pins 340, and the fourth signal pins 340 are electrically connected to multiple pads (not shown) provided on the substrate 100 of the display panel 10D, and the pads are electrically connected to multiple third clock signal lines CKL3. The third clock signal lines CKL3 are electrically coupled to the fourth signal pins 340. For example, the driving chip 300B may include a source driving circuit (not shown) and a signal generating circuit (not shown), where the signal generating circuit is used to generate signals required by the gate driving circuits (such as but not limited to the first clock signals CK1, CK2, CK3 required by the first gate driving circuit GDC1, the second gate driving circuit GDC2-A and the third gate driving circuit GDC3). In particular, in FIG. 14 and the following FIG. 15, illustration of the scan lines configured in the display area DA and electrically connected to the first gate driving circuit GDC1, the second gate driving circuit GDC2-A, and the third gate driving circuit GDC3 is omitted, and the aforementioned embodiments may be referred for the omitted parts.

However, the disclosure is not limited thereto. Similar to the embodiment shown in FIG. 12, the first clock signal lines CKL1, the second clock signal lines CKL2-A, and the third clock signal lines CKL3 may be electrically connected to the flexible circuit board, and the signal generating circuit used to generate the clock signals required by the first gate driving circuit GDC1, the second gate driving circuit GDC2-A and the third gate driving circuit GDC3 may be disposed on the flexible circuit board or on a circuit board (or system board) electrically connected to the flexible circuit board.

In some other embodiments, the clock signal lines electrically connected to a part of at least two gate driving circuits may be electrically connected to a driving chip disposed on the display panel, and the driving chip includes a signal generating circuit used for generating the clock signals required by the part of the at least two gate driving circuits, and the clock signal lines electrically connected to the other part of the at least two gate driving circuits may be electrically connected to the flexible circuit board, and the signal generating circuit used for generating the clock signals required by the other part of the at least two gate driving circuits may be disposed on the flexible circuit board or on a circuit board (or system board) electrically connected to the flexible circuit board. FIG. 15 exemplifies that the above-mentioned electrical connection method of the clock signal lines is applied to a display device including the display panel 10D of FIG. 8.

Figure 15:
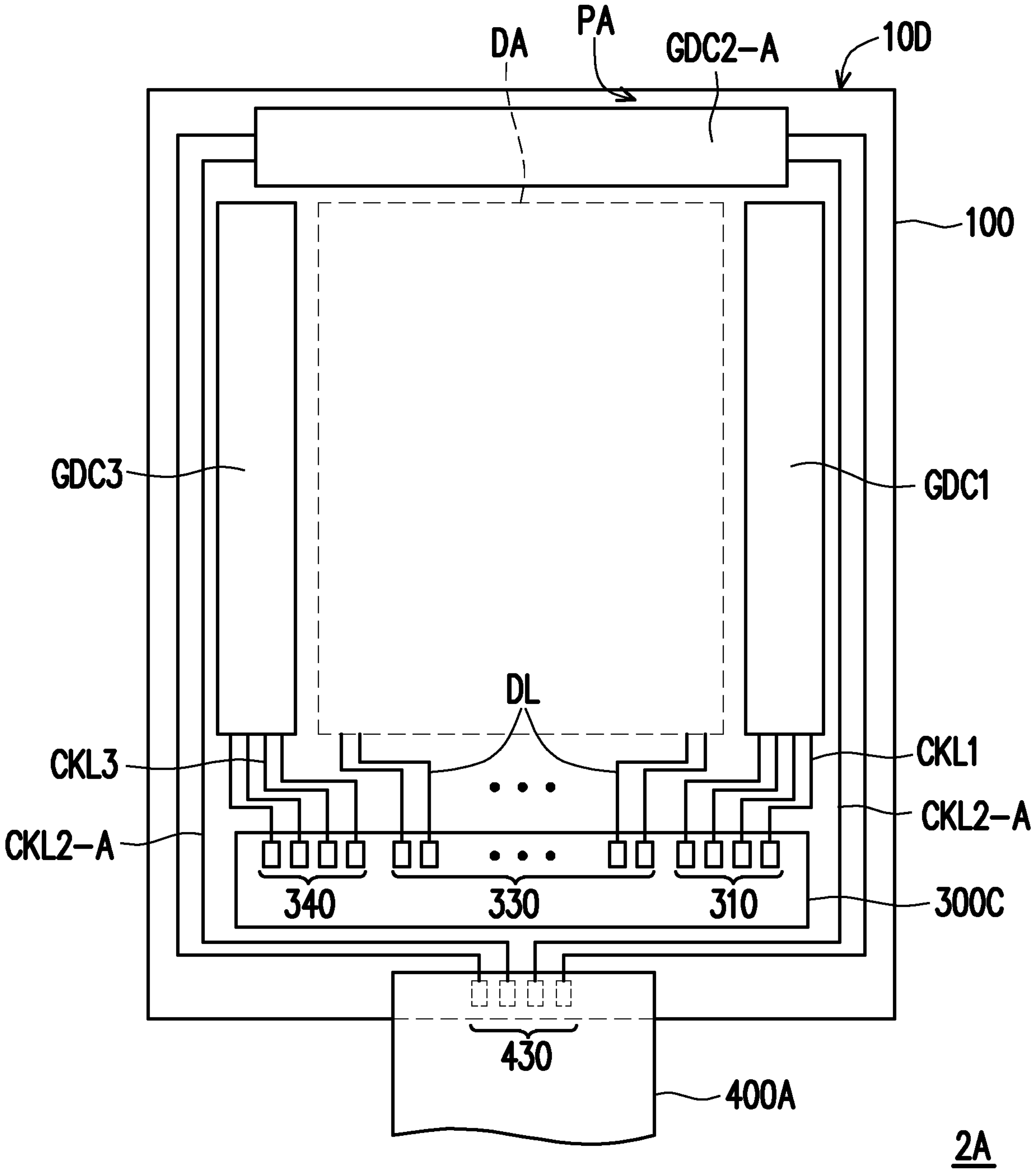
FIG. 15 is a schematic front view of a display device according to an eighth embodiment of the disclosure.

FIG. 15 is a schematic front view of a display device according to an eighth embodiment of the disclosure. Referring to FIG. 15, in the embodiment, a driving chip 300C of a display device 2A is not electrically coupled to the second clock signal lines CKL2-A. More specifically, the driving chip 300C does not have the second signal pins 320 shown in FIG. 14. The display device 2A further includes a flexible circuit board 400A electrically connected to the peripheral area PA of the substrate 100. The flexible circuit board 400A may have multiple signal pins 430, and the signal pins 430 are electrically connected to multiple pads (not shown) disposed on the substrate 100 of the display panel 10D, and the pads are electrically connected to the second clock signal lines CKL2-A. The second clock signal lines CKL2-A are electrically coupled to the flexible circuit board 400A through the signal pins 430. Therefore, in the embodiment, the signal generating circuit used for generating the signal required by the second gate driving circuit GDC2-A (such as but not limited to the clock signal required by the second gate driving circuit GDC2-A) may be disposed on the flexible circuit board 400A or on a circuit board (or system board) electrically connected to the flexible circuit board 400A.

However, the disclosure is not limited thereto. The aforementioned electrical connection method of the clock signal lines (i.e., the clock signal lines electrically connected to a part of at least two gate driving circuits may be electrically connected to the driving chip arranged on the display panel, and the clock signal lines electrically connected to the other part of the at least two gate drive circuits may be electrically connected to the flexible circuit board) may be applied in a display device including the display panel 10 of FIG. 1 and the display panel 10D of FIG. 4. For example, in another varied embodiment that is not shown in FIG. 11, one of the first clock signal lines and the second clock signal lines in FIG. 11 may be electrically coupled to the signal generating circuit through the flexible circuit board, and the other one may be electrically coupled to the driving chip disposed on the display panel.

In FIG. 14 and FIG. 15, the first gate driving circuit GDC1, the second gate driving circuit GDC2-A and the third gate driving circuit GDC3 are respectively disposed on a right side, an upper side and a left side of the display area DA, but the disclosure is not limited thereto. The locations of the first gate driving circuit GDC1, the second gate driving circuit GDC2-A and the third gate driving circuit GDC3 may be adjusted according to actual requirements, i.e., one, another, and the other of the first gate driving circuit GDC1, the second gate driving circuit GDC2-A, and the third gate driving circuit GDC3 of the display panel may be respectively disposed on the right side, the upper side and the left side of the display area DA.

It should be noted that the coupling method of the clock signal lines with the driving chip or the flexible circuit board is not limited to the content disclosed in FIG. 11 to FIG. 15. Namely, the connection relationship between the clock signal lines and the flexible circuit board or the driving chip may be adjusted according to an actual product design and application, which is not limited by the disclosure.

In summary, in the display device according to an embodiment of the disclosure, the pixel structures, the scan lines and the data lines are disposed in the display area, and the first gate driving circuit and the second gate driving circuit are arranged outside the display area. The two gate driving circuits respectively have multiple output stage circuits electrically connected to the scan lines and the clock signal lines, and the output stage circuits are respectively provided with an output transistor. As a channel width of the output transistor of each output stage circuit of the first gate driving circuit is larger than a channel width of the output transistor of each output stage circuit of the second gate driving circuit, the display device may select an appropriate gate driving circuit under operations of different driving frequencies to avoid waste of power consumption during operation.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A display device, comprising a display panel, wherein the display panel comprises:
- a substrate, provided with a display area and a peripheral area outside the display area;
- a plurality of scan lines and a plurality of data lines, disposed in the display area;
- a plurality of pixel structures, disposed in the display area, and electrically connected to the plurality of scan lines and the plurality of data lines;
- a first gate driving circuit, disposed in the peripheral area and comprising a plurality of first output stage circuits, wherein the plurality of first output stage circuits are electrically connected to the plurality of scan lines, and the first gate driving circuit is located on a first side of the display area;
- a second gate driving circuit, disposed in the peripheral area and comprising a plurality of second output stage circuits, wherein the plurality of second output stage circuits are electrically connected to the plurality of scan lines, and the second gate driving circuit is located on a second side of the display area; and
- another gate driving circuit, disposed in the peripheral area and comprising a plurality of another output stage circuits, wherein the plurality of another output stage circuits are electrically connected to the plurality of scan lines, and the another gate driving circuit is located on a third side of the display area,
- wherein the plurality of first output stage circuits respectively have a first output transistor, the plurality of second output stage circuits respectively have a second output transistor, and a channel width of the first output transistor is greater than a channel width of the second output transistor, when the display panel is driven at a first frame rate, the plurality of first output stage circuits output a plurality of first gate driving signals to the plurality of scan lines; when the display panel is driven at a second frame rate, the plurality of second output stage circuits output a plurality of second gate driving signals to the plurality of scan lines, wherein the first frame rate is greater than the second frame rate,
- wherein the another gate driving circuit is a third gate driving circuit, the plurality of another output stage circuits are a plurality of third output stage circuits, and the plurality of third output stage circuits are electrically connected to the plurality of scan lines,
- wherein the plurality of third output stage circuits respectively have a third output transistor, and a channel width of the third output transistor is smaller than the channel width of the second output transistor.

2. The display device according to claim 1, wherein the display panel further comprises a plurality of first clock signal lines and a plurality of second clock signal lines disposed in the peripheral area, wherein the plurality of first output stage circuits are electrically connected to the plurality of first clock signal lines, the plurality of second output stage circuits are electrically connected to the plurality of second clock signal lines, the plurality of first clock signal lines are adapted to transmit a plurality of first clock signals to the plurality of first output stage circuits, the plurality of second clock signal lines are adapted to transmit a plurality of second clock signals to the plurality of second output stage circuits, and a frequency of each of the first clock signals is greater than a frequency of each of the second clock signals.

3. The display device according to claim 1, wherein when the display panel is driven at a third frame rate, the plurality of third output stage circuits output a plurality of third gate driving signals to the plurality of scan lines, wherein the second frame rate is greater than the third frame rate.

4. The display device according to claim 1, wherein the second side is adjacent to the first side, and the third side is adjacent to the second side and opposite to the first side.

5. The display device according to claim 4, wherein the display panel further comprises:

a plurality of auxiliary signal lines, electrically connected to the second gate driving circuit, and each of the scan line is electrically connected to a corresponding one of the plurality of auxiliary signal lines.

6. The display device according to claim 5, wherein each of the pixel structure comprises:

a pixel transistor, electrically connected to one of the scan lines and one of the data lines;

a pixel electrode, electrically connected to the pixel transistor; and a common electrode, overlapping the pixel electrode, wherein the plurality of auxiliary signal lines are electrically connected to the plurality of scan lines through a plurality of conductive patterns, and one of the pixel electrode and the common electrode is of a same film layer as the plurality of conductive patterns.

7. The display device according to claim 5, wherein the plurality of scan lines belong to a first metal layer, the plurality of auxiliary signal lines belong to a second metal layer, and the display panel further comprises:

an insulating layer, located between the first metal layer and the second metal layer, and the insulating layer has a plurality of through holes, wherein each of the auxiliary signal lines is electrically connected to a corresponding one of the scan lines through a corresponding one of the through holes.

8. The display device according to claim 1, wherein the display panel further comprises:

a plurality of first clock signal lines and a plurality of second clock signal lines disposed in the peripheral area, wherein the plurality of first output stage circuits are electrically connected to the plurality of first clock signal lines, and the plurality of second output stage circuits are electrically connected to the plurality of second clock signal lines, and the display device further comprises:

a driving chip, disposed on the substrate and located in the peripheral area, wherein the driving chip has a plurality of first signal pins, a plurality of second signal pins, and a plurality of third signal pins, the plurality of first clock signal lines are electrically coupled to the first signal pins, the plurality of second clock signal lines are electrically coupled to the second signal pins, and the plurality of data lines are electrically coupled to the third signal pins.

9. The display device according to claim 1, wherein the display panel further comprises:

a plurality of first clock signal lines and a plurality of second clock signal lines disposed in the peripheral area, wherein the plurality of first output stage circuits are electrically connected to the plurality of first clock signal lines, and the plurality of second output stage circuits are electrically connected to the plurality of second clock signal lines, and the display device further comprises:

a driving chip, disposed on the substrate, and located in the peripheral area, wherein the driving chip has a plurality of first signal pins and a plurality of second signal pins, and the plurality of data lines are electrically coupled to the second signal pins; and a flexible circuit board, wherein the plurality of first clock signal lines and the plurality of second clock signal lines are respectively electrically coupled to the plurality of first signal pins and the flexible circuit board, or respectively electrically coupled to the flexible circuit board and the plurality of first signal pins.

10. The display device according to claim 1, wherein the display panel further comprises:

a plurality of first clock signal lines and a plurality of second clock signal lines, disposed in the peripheral area, wherein the plurality of first output stage circuits are electrically connected to the plurality of first clock signal lines, and the plurality of second output stage circuits are electrically connected to the plurality of second clock signal lines, and the display device further comprises:

a flexible circuit board, electrically coupled to the plurality of first clock signal lines and the plurality of second clock signal lines.

11. The display device according to claim 10, wherein the flexible circuit board is provided with a voltage level shifter circuit, wherein the plurality of first clock signal lines and the plurality of second clock signal lines are electrically coupled to the voltage level shifter circuit.

12. A display device, comprising a display panel, wherein the display panel comprises:

a substrate, provided with a display area and a peripheral area outside the display area;

a plurality of scan lines and a plurality of data lines, disposed in the display area;

a plurality of pixel structures, disposed in the display area, and electrically connected to the plurality of scan lines and the plurality of data lines;

a first gate driving circuit, disposed in the peripheral area and comprising a plurality of first output stage circuits, wherein the plurality of first output stage circuits are electrically connected to the plurality of scan lines, and the first gate driving circuit is located on a first side of the display area;

a second gate driving circuit, disposed in the peripheral area and comprising a plurality of second output stage circuits, wherein the plurality of second output stage circuits are electrically connected to the plurality of scan lines, and the second gate driving circuit is located on a second side of the display area; and another gate driving circuit, disposed in the peripheral area and comprising a plurality of another output stage circuits, wherein the plurality of another output stage circuits are electrically connected to the plurality of scan lines, and the another gate driving circuit is located on a third side of the display area, wherein the plurality of first output stage circuits respectively have a first output transistor, the plurality of second output stage circuits respectively have a second output transistor, and a channel width of the first output transistor is greater than a channel width of the second output transistor, when the display panel is driven at a first frame rate, the plurality of first output stage circuits output a plurality of first gate driving signals to the plurality of scan lines; when the display panel is driven at a second frame rate, the plurality of second output stage circuits output a plurality of second gate driving signals to the plurality of scan lines, wherein the first frame rate is greater than the second frame rate, wherein the another gate driving circuit is another first gate driving circuit, the plurality of another output stage circuits are a plurality of another first output stage circuits, the plurality of another first output stage circuits respectively have another first output transistor, and a channel width of the another first output transistor is equal to the channel width of the first output transistor.

13. The display device according to claim 12, wherein two ends of each of the plurality of scan lines are respectively electrically connected to the first gate driving circuit and the another first gate driving circuit.

14. The display device according to claim 12, wherein the first gate driving circuit is electrically connected to odd-numbered scan lines of the plurality of the scan lines, and the another first gate driving circuit is electrically connected to even-numbered scan lines of the plurality of the scan lines.

15. A display device, comprising a display panel, wherein the display panel comprises:

a substrate, provided with a display area and a peripheral area outside the display area;

a plurality of scan lines and a plurality of data lines, disposed in the display area;

a plurality of pixel structures, disposed in the display area, and electrically connected to the plurality of scan lines and the plurality of data lines;

a first gate driving circuit, disposed in the peripheral area and comprising a plurality of first output stage circuits, wherein the plurality of first output stage circuits are electrically connected to the plurality of scan lines, and the first gate driving circuit is located on a first side of the display area;

a second gate driving circuit, disposed in the peripheral area and comprising a plurality of second output stage circuits, wherein the plurality of second output stage circuits are electrically connected to the plurality of scan lines, and the second gate driving circuit is located on a second side of the display area; and another gate driving circuit, disposed in the peripheral area and comprising a plurality of another output stage circuits, wherein the plurality of another output stage circuits are electrically connected to the plurality of scan lines, and the another gate driving circuit is located on a third side of the display area, wherein the plurality of first output stage circuits respectively have a first output transistor, the plurality of second output stage circuits respectively have a second output transistor, and a channel width of the first output transistor is greater than a channel width of the second output transistor, when the display panel is driven at a first frame rate, the plurality of first output stage circuits output a plurality of first gate driving signals to the plurality of scan lines; when the display panel is driven at a second frame rate, the plurality of second output stage circuits output a plurality of second gate driving signals to the plurality of scan lines, wherein the first frame rate is greater than the second frame rate, wherein the another gate driving circuit is another second gate driving circuit, the plurality of another output stage circuits are a plurality of another second output stage circuits, the plurality of another second output stage circuits respectively have another second output transistor, and a channel width of the another second output transistor is equal to the channel width of the second output transistor.

16. The display device according to claim 15, wherein the second side is opposite to the third side, and two ends of the first side are respectively coupled to the second side and the third side.

17. The display device according to claim 16, wherein two ends of each of the plurality of scan lines are respectively electrically connected to the second gate driving circuit and the another second gate driving circuit.

18. The display device according to claim 16, wherein the second gate driving circuit is electrically connected to odd-numbered scan lines of the plurality of the scan lines, and the another second gate driving circuit is electrically connected to even-numbered scan lines of the plurality of the scan lines.

* * * * *